(12) United States Patent
Robinson

(10) Patent No.: US 7,471,995 B1
(45) Date of Patent: *Dec. 30, 2008

(54) TRANSMISSION, RECEIPT, COMBINATION, SORTING, AND PRESENTATION OF VEHICLE SPECIFIC ENVIRONMENTAL CONDITIONS AND HAZARDS INFORMATION

(75) Inventor: Paul A. Robinson, Norfolk, VA (US)

(73) Assignee: AeroTech Research (USA), Inc., Newport News, VA (US)

( * ) Notice: Subject to any disclaimer, the term of this patent is extended or adjusted under 35 U.S.C. 154(b) by 360 days.

This patent is subject to a terminal disclaimer.

(21) Appl. No.: 11/475,670

(22) Filed: Jun. 27, 2006

Related U.S. Application Data

(63) Continuation-in-part of application No. 11/122,909, filed on May 5, 2005, which is a continuation-in-part of application No. 10/408,024, filed on Apr. 4, 2003, now Pat. No. 6,917,860, which is a continuation-in-part of application No. 10/083,840, filed on Feb. 27, 2002, now Pat. No. 6,650,972, which is a continuation-in-part of application No. 09/583,042, filed on May 26, 2000, now Pat. No. 6,381,538.

(51) Int. Cl.
*G01C 23/00* (2006.01)

(52) U.S. Cl. .................... 701/3; 701/14; 701/201; 701/211; 340/901

(58) Field of Classification Search .......... 701/1, 701/3, 14, 201, 202, 210, 211; 342/26 R; 702/3; 340/901
See application file for complete search history.

(56) References Cited

U.S. PATENT DOCUMENTS

| | | | |
|---|---|---|---|
| 3,781,530 A | 12/1973 | Britland et al. | |
| 4,521,857 A | 6/1985 | Reynolds, III | |
| 4,646,244 A | 2/1987 | Bateman et al. | |
| 5,187,478 A | 2/1993 | Grove | |
| 5,265,024 A | 11/1993 | Crabill et al. | |
| 5,541,591 A | 7/1996 | Bush | |
| 5,615,118 A | 3/1997 | Frank | |
| 5,654,700 A | 8/1997 | Prata et al. | |
| 5,657,009 A | 8/1997 | Gordon | |
| 5,751,289 A | 5/1998 | Myers | |
| 5,999,882 A | 12/1999 | Simpson et al. | |
| 6,014,606 A | 1/2000 | Tu | |
| 6,043,756 A | 3/2000 | Bateman et al. | |
| 6,085,147 A | 7/2000 | Myers | |
| 6,199,008 B1 | 3/2001 | Aratow et al. | |
| 6,202,024 B1 * | 3/2001 | Yokoyama et al. | 701/207 |
| 6,289,277 B1 | 9/2001 | Feyereisen et al. | |

OTHER PUBLICATIONS

Dr. Paul A. Robinson et al.; *Using Airborne Turbulence Detection & Reporting Technologies to Increase Air Space Utilization*; Jul. 2005.

* cited by examiner

*Primary Examiner*—Gertrude Arthur Jeanglaud
(74) *Attorney, Agent, or Firm*—Bowman Green Hampton & Kelly, PLLC

(57) ABSTRACT

A method for planning or updating a travel route for a vehicle based on a potential affect of environmental conditions on a particular vehicle and displaying environmental conditions information on a display.

19 Claims, 13 Drawing Sheets

TRANSMISSION, RECEIPT, COMBINATION, SORTING, AND PRESENTATION OF VEHICLE SPECIFIC ENVIRONMENTAL CONDITIONS AND HAZARDS INFORMATION

CROSS-REFERENCE TO RELATED APPLICATIONS

This is a Continuation-In-Part of co-pending U.S. patent application Ser. No. 11/122,909, filed May 5, 2005, which is a Continuation-In-Part of U.S. patent application Ser. No. 10/408,024, filed Apr. 4, 2003, and issued Jul. 12, 2005, as U.S. Pat. No. 6,917,860, which is a Continuation-In-Part of U.S. patent application Ser. No. 10/083,840, filed Feb. 27, 2002, and issued Nov. 18, 2003, as U.S. Pat. No. 6,650,972, which is a Continuation-In-Part of U.S. patent application Ser. No. 09/583,042, filed May 26, 2000, and issued Apr. 30, 2002, as U.S. Pat. No. 6,381,538, the disclosures of which are incorporated herein by reference.

BACKGROUND OF THE INVENTION

1. Field of the Invention

This invention relates to the transmission, receipt, and presentation of vehicle specific environmental conditions and hazards information.

2. Description of Related Art

Whether planning a flight, flying a pre-planned route, or altering a flight en route, pilots need up-to-date, accurate information on the environmental conditions that they are likely to encounter. Environmental conditions can include, for example, meteorological and other environmental conditions, such as, storms, rain, turbulence, aircraft wake turbulence, lightning, icing, fog, volcanic ash, wind speed, wind direction, wind variation, or the like. Before a flight begins, available environmental conditions information must, at the very least, alert the pilot to the environmental conditions for the departure location, the arrival location, and the intended travel route. During the flight, the pilot must be able to access updated environmental conditions information for not only the present location of the aircraft, but also for the remainder of the intended travel route, the arrival location, and any alternate routes that may be used in case of emergency.

To accomplish this, the pilot typically receives environmental conditions information in the form of various maps, printouts, and/or displays that detail environmental conditions that the aircraft is likely to encounter. Some of the information sources, such as, for example, pressure or jet-stream maps, make the pilot aware of environmental conditions that affect the aircraft directly, such as, for example, wind speed. Other sources of information, such as, for example, radar reflectivity maps, or Nexrad data, advise the pilot of conditions that affect the aircraft indirectly. For example, raindrops, which do not affect the aircraft directly, appear as areas of high reflectivity on radar reflectivity maps and infer areas of turbulence.

The pilot must then compare all of the environmental conditions information that he or she receives with his or her knowledge, experience, and judgment, to determine a navigable course through the maze of environmental conditions.

To help the pilot to assimilate the vast amount of information, it is known to transmit certain weather data to the cockpit of an aircraft so that the weather data can be displayed and periodically updated.

As an example of displaying environmental conditions information to a pilot, it is known to use enhanced weather radar to measure wind variations in an area ahead of an aircraft. The wind variation measurements are then processed to determine regions of potentially hazardous wind shear. These determined regions are then displayed on a map as a series of variable sized, color-coded pie shapes. The different color codes represent different intensities of wind variation, while the size of each pie shape shows an approximate size of the hazardous area. By understanding the color codes and the size variations of these displayed pie shapes, the pilot can take appropriate actions to negotiate a way through a hazardous area or avoid the hazardous area completely, without flying into another hazardous area.

SUMMARY OF THE INVENTION

When making flight decisions, the pilot cannot merely consider environmental conditions information in a vacuum, the pilot must also consider aircraft specific characteristics, such as, for example, the physical size, weight, propulsion, mode of propulsion, performance characteristics, and performance limitations of the aircraft that he or she is flying. Performance characteristics can include, for example, the type of control systems, control surfaces, the presence and functionality of any automated systems, and both the longitudinal and lateral aerodynamics of the aircraft. Performance limitations can include, for example, the aircraft's maximum speed and Mach number, buffet speed, operational ceiling, maximum weight, center of gravity, as well as the structural and mechanical limitations of the aircraft.

Some of the aircraft specific characteristics, such as the aircraft's size, propulsion, mode of propulsion, structure, type of control system(s), type of control surfaces, longitudinal aerodynamics, lateral aerodynamics, maximum weight, structural limitations, mechanical limitations, performance limitations, safety limitations, maximum operational ceiling, maximum Mach numbers, and maximum airspeeds are characteristics that are typically static and do not change during flight. Other of the aircraft specific characteristics, such as the aircraft's weight, performance characteristics, center of gravity, vertical acceleration, lateral acceleration, speed, angle of attack, angle of sideslip, and direction are typically dynamic, and change during flight.

Furthermore, certain types of environmental conditions affect different aircraft in different ways and to varying degrees while other types of environmental conditions affect all aircraft in much the same way and to much the same degree. For example, storms, turbulence, aircraft wake turbulence, icing, fog, volcanic ash, winds, or the like, can affect a large, jet-engine aircraft differently than a small, propeller-driven aircraft. In contrast, environmental conditions, such as, for example, ground terrain, structures, lightning, or the like, can affect both large and small aircraft alike.

To illustrate, a large multi-engine passenger aircraft might be able to fly, safely and comfortably, through an area of turbulence that would cause a small single-engine aircraft to be thrown about quite violently. However, that same, large multi-engine passenger aircraft will react differently when it is loaded with passengers, fuel, or cargo than it will when it is relatively empty. Furthermore, a private jet, with an excess of available power, can fly in conditions that a small, single engine, propeller-driven aircraft cannot. But, both large and small aircraft alike can be catastrophically affected by, for example, a lightning strike.

As a further illustration, the altitude of the aircraft may determine whether and to what extent the aircraft encounters certain environmental conditions, such as turbulence. For example, there might be an area of thunderstorms that can be avoided if the pilot flies over the storms at a higher altitude. Unfortunately, the operational ceiling of the aircraft may not allow the aircraft to fly high enough to travel over the storms. Alternatively, the operational ceiling of the aircraft may be limited because of certain performance limitations of the aircraft. Additionally, the pilot of the aircraft may not be allowed, if, for example, the pilot is only visual flight rules (VFR) rated, to fly above a predetermined altitude. Furthermore, air traffic control (ATC) may not allow the pilot to make an altitude change.

Therefore, because the impact of any given set of environmental conditions is not the same for every aircraft, and different aircraft react very differently to different environmental conditions, the pilot must consider not only the present environmental conditions that the aircraft is about to encounter, but also the specific flight characteristics of the aircraft that he or she is flying.

Thus, a system that combines environmental conditions information with aircraft specific information and produces a simplified display map showing any environmental conditions that are relevant to a particular aircraft, improves pilot awareness, reduces the workload on the pilot, and improves the safety level to the aircraft, the pilot, and any passengers and/or cargo onboard.

Thus, in contrast to the example of merely displaying environmental conditions information described above, this invention allows the pilot to look at the display map without having to determine, for example, which color-coded pie shapes represent wind variations that are intense enough to adversely affect his or her particular aircraft. To the contrary, the display map of this invention only displays environmental conditions that exceed a determined threshold and can actually affect the pilot's particular aircraft. Thus, in contrast to the example described above, the display map of this invention will only show areas of wind variation that are intense enough to adversely affect the pilot's aircraft.

In various illustrative, non-limiting embodiments of this invention, the systems and methods of this invention are able to optimize a travel route based on both environmental conditions information and aircraft specific information. The travel route may be optimized based on default criteria or criteria selected by the pilot, such as, for example, best fuel economy, fuel burn, trip costs (including fuel economy), most comfortable ride, fastest traverse of a particular region, changing configuration of the aircraft and/or overall airspace management.

Thus, the travel route may be altered or updated by this invention based on a request from, for example, a pilot, an air traffic controller, or may be altered or updated automatically in response to a change in either the environmental conditions or the aircraft characteristics.

In various illustrative, non-limiting embodiments of this invention, the travel route optimization may be requested and/or carried out by the systems and methods of this invention operating on a remote, or ground, static display.

In various exemplary embodiments, the systems and methods of this invention are able to produce projected dynamic vehicle information such that the status of certain of the aircraft characteristics, such as, for example, the aircraft's weight, can be projected for at least one point along a travel route.

It should be appreciated that the embodiments described above involve displaying environmental conditions data relative to a specific aircraft. However, in various exemplary embodiments of this invention, the environmental conditions data is processed and displayed in other vehicles, such as, for example, helicopters, watercraft, hovercraft, automotive vehicles, or the like.

When the vehicle is, for example, an aircraft, the environmental conditions information may include, for example, cloud type, cloud altitude, visibility, storms, rain, precipitation, turbulence, aircraft wake turbulence, lightning, icing, fog, volcanic ash, wind speed, wind direction, wind variation, temperature, restricted areas, or the like. It should also be appreciated that the environmental conditions information is displayed relative to each particular aircraft's attributes, such as, for example, the physical size, weight, direction, speed, propulsion, mode of propulsion, response characteristics, performance characteristics, performance limitations, or the like of the aircraft.

When the vehicle is, for example, a watercraft, the environmental conditions information may include, for example, water temperature, water depth, water conditions, wave height, wind speed, wind direction, water current, water undercurrent data, or the like. It should also be appreciated that the environmental conditions information is displayed relative to each particular watercraft's attributes, such as, for example, size, weight, speed, propulsion, mode of propulsion, hull design, draft, performance characteristics, response characteristics, or the like.

When the vehicle is, for example, an automotive vehicle, the environmental conditions information may include, for example, weather conditions, wind speed, wind direction, accumulated precipitation information, road conditions, grade of terrain traversed, or the like. It should also be appreciated that the environmental conditions information is displayed relative to each particular automotive vehicle's attributes, such as, for example, two wheel or four wheel drive, gross vehicle weight, speed, height, center of gravity, or the like. If, for example, the vehicle is a tractor-trailer, the display may include wind speed and direction information so that a driver can avoid areas of crosswinds that are strong enough to tip the vehicle or force the vehicle off a road.

In various illustrative, non-limiting embodiments of this invention, the environmental conditions data relative to a specific aircraft can be created or transmitted to remote, or ground, static displays, such that the environmental conditions data relative to a specific aircraft can be displayed, for example, for air traffic controls, airline dispatchers, or other operators remote from the receiving vehicle. In this manner, displays of environmental conditions information may be provided to, for example, center controllers or traffic management personnel so that the information may be used for airline dispatch flight following, flight planning, air traffic control, and/or air traffic management purposes.

Accordingly, this invention provides apparatuses, systems, and methods that present a user with a simplified environmental conditions map based on a scientific and technical analysis of both environmental conditions information and data specific to the vehicle that the user is operating.

This invention separately provides apparatuses, systems, and methods that produce a simplified, integrated, iconized map including environmental conditions information indicating the location, spatial extent, and severity of each environmental condition.

This invention separately provides apparatuses, systems, and methods that update vehicle specific data to reflect changes to the vehicle's weight, performance characteristics, and/or configuration.

This invention separately provides apparatuses, systems, and methods that simplify the route-planning task by suggesting optimized routings based on minimizing certain parameters.

This invention separately provides apparatuses, systems, and methods that plot and/or update a travel plan using both environmental conditions information and data specific to the vehicle that the user is operating.

This invention separately provides apparatuses, systems, and methods that automatically suggest courses of travel, either prior to departure or while en route, through or around various environmental conditions based on the specific characteristics of a particular vehicle.

This invention separately provides apparatuses, systems, and methods that optimize a course around various environmental conditions based on specific criteria, such as, for example, best fuel economy, most comfortable ride, fastest traverse of a particular region, and/or changing configuration of the vehicle.

This invention separately provides apparatuses, systems, and methods that can be used prior to departure or onboard a vehicle to interpret weather and/or environment data that is transmitted or broadcast to the vehicle.

This invention separately provides apparatuses, systems, and methods that provide the user with improved situational awareness of hazards to the user's specific vehicle.

This invention separately provides apparatuses, systems, and methods that improve safety by reducing the impact of adverse environment conditions on a specific vehicle.

This invention separately provides apparatuses, systems, and methods that produce timely and useful alerts, as well as transmit additional alerts and/or environment data if the environmental conditions change.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF THE PREFERRED EMBODIMENT

For simplicity and clarification, the operating principles, design factors, and layout of the environmental conditions display systems, methods, and apparatuses according to this invention are explained with reference to various exemplary embodiments of environmental conditions display systems, methods, and apparatuses according to this invention. The basic explanation of the operation of the environmental conditions display systems, methods, and apparatuses is applicable for the understanding and design of the constituent components employed in the environmental conditions display systems, methods, and apparatuses of this invention.

Furthermore, it should be appreciated that, for simplicity and clarification, the embodiments of this invention will be described with reference to the environmental conditions display systems, methods, and apparatuses as they operate in an aircraft. Alternatively, the systems, methods, and apparatuses of this invention can be implemented in other vehicles, such as, for example, helicopters, watercraft, hovercraft, automotive vehicles, or the like.

It should also be appreciated that the terms "vehicle", "aircraft", and "environmental conditions" are for basic explanation and understanding of the operation of the environmental conditions display systems, methods, and apparatuses. Therefore, the terms "vehicle", "aircraft", and "environmental conditions" are not to be construed as limiting the environmental conditions display systems, methods, and apparatuses of this invention.

Figure 1:
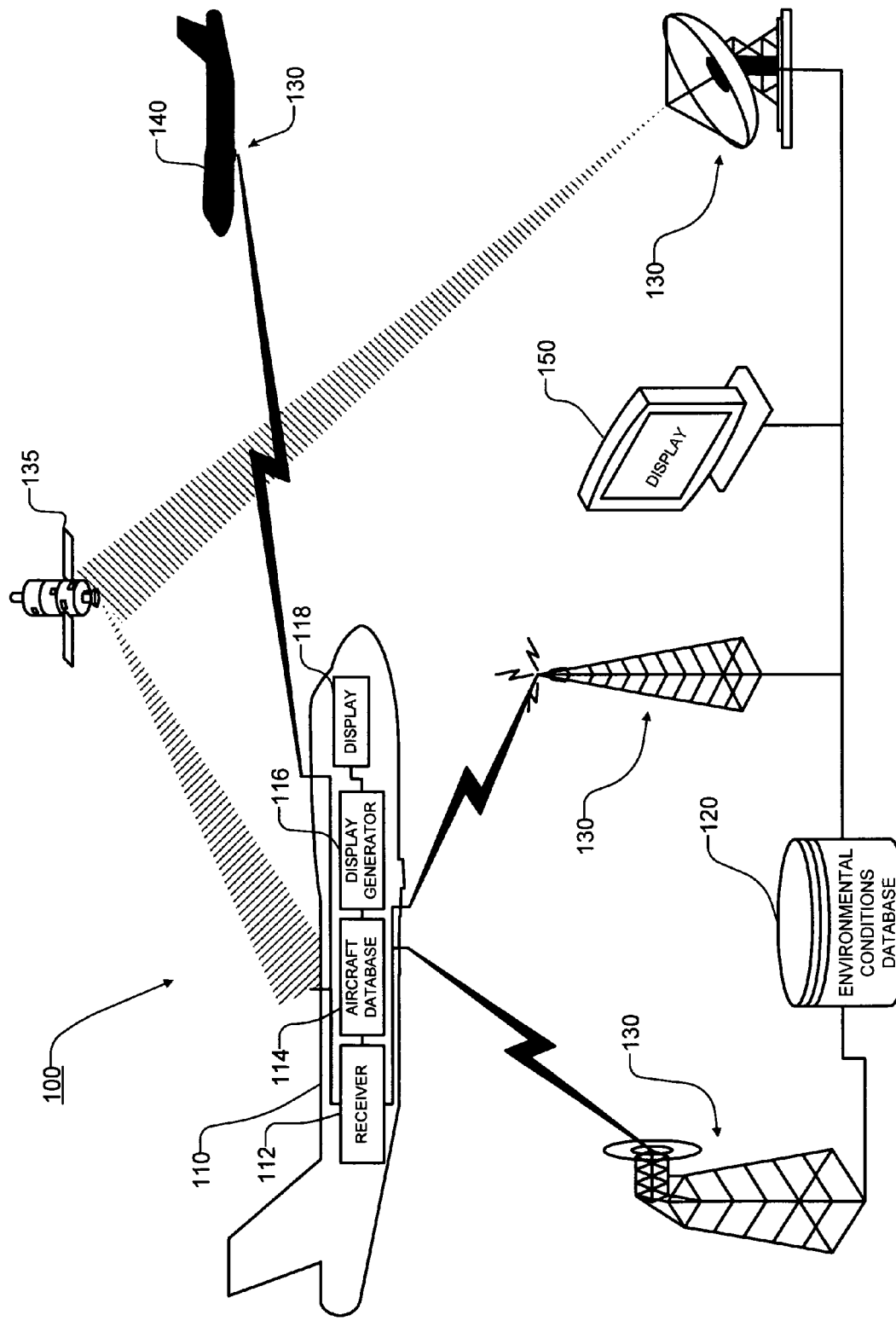
FIG. 1 shows a first exemplary embodiment of the environmental conditions display system according to this invention.

FIG. 1 shows an environmental conditions display system incorporating a first exemplary embodiment of an environmental conditions display system 100 according to this invention. As shown in FIG. 1, the environmental conditions display system 100 includes at least some of an aircraft 110, an environmental conditions database 120, and at least one environmental conditions transmitter 130.

The aircraft 110 includes at least some of a receiver 112, an aircraft characteristics database 114, a display generator 116, and a display 118. In various exemplary embodiments, the display generator 116 interfaces, via the receiver 112, with the at least one environmental conditions transmitter 130. The display generator 116 also interfaces with the aircraft characteristics database 114 and the display 118.

In the various exemplary embodiments, the aircraft characteristics database 114 includes a database that stores static aircraft specific information and a database that stores dynamic aircraft specific information. In various exemplary embodiments, various systems and/or sensors of the aircraft 110 periodically update the dynamic aircraft specific information stored in the aircraft characteristics database 114.

At least some of the dynamic aircraft specific information in the database may include predetermined dynamic aircraft specific values, default dynamic aircraft specific information, or an estimated or projected value. In this manner, if an aircraft does not include the necessary systems and/or sensors to monitor or update all of the dynamic aircraft specific information, predetermined values may be used.

In various exemplary embodiments, the predetermined, default, estimated, or projected dynamic aircraft specific values can be stored in a "look-up table" that can be stored, for example, in the aircraft characteristics database 114.

Additionally, at least some of the static aircraft specific information in the database may include predetermined or default static aircraft specific information. Thus, for example, published standards for a particular class of aircraft or an aircraft fleet average may be used as the default values for an individual aircraft's static characteristics.

While the use of predetermined or estimated dynamic and/or static vehicle information may not provide as exact an estimation of turbulence, the use of such information in place of exact dynamic or static vehicle information can still yield useful turbulence load information. For example, in order to make a good estimate of the turbulence loads predicted by an airborne weather radar, it is necessary to know the weight of the aircraft at that point in time. Unfortunately, current airborne weather radars do not have access to such real-time dynamic information. Nonetheless, a useful turbulence load estimate can still make by employing an estimate of what the weight might be based on the class of aircraft or statistical or probabilistic estimates of the weight of the aircraft, stored in the radar memory.

In the various exemplary embodiments described herein, the display generator 116 is an environmental conditions display system 500, as shown below, with reference to FIG. 5. In various exemplary embodiments, the display generator 116 interfaces, for example, with the environmental conditions database 120, via a wireless link using the receiver 112 and the at least one environmental conditions transmitter 130. Alternatively, the display generator 116 can interface with the environmental conditions database 120, either directly or indirectly, via any linked connection. The linked connection can be any known or later developed device or system for connecting the display generator 116 to the environmental conditions database 120, including a direct wired connection, a connection over a LAN, a WAN, or any other distributed network, a connection over the public switched telephone network, a connection over a coaxial cable (i.e., CATV) system, a connection over a cellular telephone network, a very high frequency (VHF) connection, an ultra high frequency (UHF) connection, a radio frequency (RF) connection, a satellite connection, or the like. In general, the linked connection can be any known or later developed connection system or structure usable to connect the display generator 116 to the environmental conditions database 120, including both wired and wireless connections.

In various exemplary embodiments, the display generator 116 interfaces with the display 118. The display 118 can be a cathode ray tube display, a liquid crystal display, a plasma display, a light emitting diode (LED) display, a printer, or any other known or later developed system capable of displaying data.

In various exemplary embodiments, the at least one environmental conditions transmitter 130 is, for example, a VHF transmitter, a UHF transmitter, a RF transmitter, a satellite transmitter, or the like. When the at least one environmental conditions transmitter 130 is, for example, a satellite transmitter, the at least one environmental conditions transmitter 130 operates in conjunction with at least one satellite 135. In various exemplary embodiments, the at least one environmental conditions transmitter 130 is, for example, a transmitter included in another aircraft that transmits environmental conditions information. Thus, in various exemplary embodiments, the receiver 112 includes at least one of a VHF antenna, a UHF antenna, a RF antenna, a satellite communications receiver, or the like.

During operation of the environmental conditions display system 100, the display generator 116, receives, via the receiver 112, signals from the at least one environmental conditions transmitter 130 and/or at least one satellite 135. The signals from the at least one environmental conditions transmitter 130 contain at least some environmental conditions data from the environmental conditions database 120. In various exemplary embodiments, the signals also include global positioning system (GPS) data, which allows the systems, methods, and apparatuses of this invention to determine the location and/or the speed of the aircraft. In the various exemplary embodiments, the display generator 116 includes an environmental conditions database that stores at least the received environmental conditions data from the environmental conditions database 120.

In various exemplary embodiments, signals can be received from any source, including, but not limited to, the at least one environmental conditions transmitter 130 and/or at least one satellite 135.

Additionally, signals can be received from any number or type of sources, such as, for example, another aircraft, vehicle, server, data center, or any other communications provider or source. When signals are received from multiple sources, environmental conditions information from each of the sources can be compared, merged, and/or combined, in whole or in part, such that a meaningful display of the environmental conditions information can be created.

In various exemplary, non-limiting embodiments, comparing, merging, and/or combining the environmental conditions information from multiple sources includes comparing, for example, the relative ages of the information and determining whether any of the information is duplicative.

For example, environmental conditions information in the form of turbulence reports can be received directly from another aircraft via an air-to-air datalink, satcomm, or other mode, while additional environmental conditions information can be received from a server on the ground. Likewise, ground-based radars and airborne systems radars may both develop maps of environmental conditions information. While the two systems typically have different capabilities with regard to resolution, range, etc., the merging and use of maps or information from both sources will provide useful and capable environmental conditions information.

When the display generator 116 receives the environmental conditions data, the display generator 116 compares the environmental conditions data to the static and dynamic aircraft characteristics stored in the aircraft characteristics database 114, as described above, and determines whether there are any environmental conditions that exceed a determined threshold and will affect the aircraft. The display generator 116 then creates a display map that includes all of the environmental conditions that will affect the aircraft and sends the map to the display 118 to be displayed.

In various exemplary embodiments, the displayed map is automatically updated periodically to reflect changes not only to the aircraft location and the environmental conditions, but also to the aircraft characteristics, such as, for example, the reduced weight of the aircraft due to fuel consumption, payload discharge, or weapons release.

In various exemplary embodiments, the environmental conditions information is sorted temporally and spatially. Spatial sorting allows only environmental conditions information at certain altitudes or along specified paths to be displayed on the display 118. Temporal sorting allows a "looping" of the environmental conditions information over a period of time. By looping the environmental conditions information and displaying the looped information on the display 118, the motion and trend of certain environmental conditions can be identified and future environmental conditions may be predicted.

For example if a database of turbulence reports for a given location (along or near a planned flight route, or geographic section of the country) is requested and/or provided to an aircraft or user, the environmental conditions information may span several hours and be at a variety of altitudes. The environmental conditions information can still be of some use but will have to be shown in a particular manner on the display 118. For example, the temporal variation of the reports can give information on the direction a particular environmental condition is moving and whether the environmental condition is intensifying or decaying.

In various illustrative, non-limiting embodiments of this invention, the environmental conditions information relative to a specific aircraft can be created or transmitted to at least one remote, or ground display 150. In this manner, the environmental conditions data relative to a specific aircraft can be displayed, for example, for air traffic controllers, airline dispatchers, or other operators remote from the receiving vehicle. Thus, displays of environmental conditions information may be provided to, for example, center controllers or traffic management personnel so that the information may be used for airline dispatch flight following, flight planning, air traffic control, and/or air traffic management purposes.

In various illustrative, non-limiting embodiments of this invention, the environmental conditions information may not be scaled to any specific aircraft, but merely displayed as reported, so that the display 150 may receive and simultaneously display reports from multiple vehicles.

Figure 2:
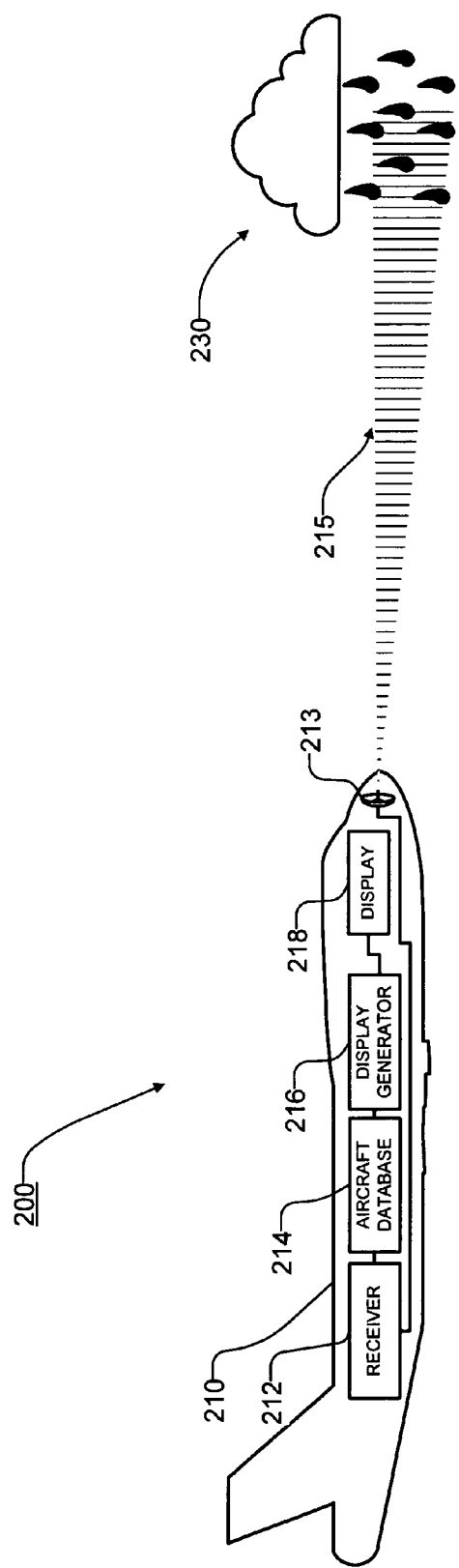
FIG. 2 shows a second exemplary embodiment of the environmental conditions display system according to this invention.

FIG. 2 shows an environmental conditions display system incorporating a second exemplary embodiment of an environmental conditions display system 200 according to this invention. As shown in FIG. 2, the environmental conditions display system 200 includes at least some of an aircraft 210, a receiver 212, an aircraft characteristics database 214, a display generator 216, and a display 218.

The elements of the environmental conditions display system 200 correspond to and operate similarly to the same elements discussed above with respect to the environmental conditions display system 100 of FIG. 1. However, in various exemplary embodiments, the environmental conditions display system 200 does not require the at least one environmental conditions transmitter 130 in order to receive the environmental conditions information.

In various exemplary embodiments of the environmental conditions display system 200, the display generator 216 receives, via the receiver 212, environmental conditions information from an onboard system or various onboard systems, such as, for example, an onboard monitoring system 213. In various exemplary embodiments, the onboard monitoring system 213 is a weather radar, an infrared (IR) sensor, a laser radar (LIDAR), or the like.

Thus, the environmental conditions display system 200 provides a map of an area based on the static and dynamic characteristics of the aircraft received from the aircraft characteristics database 214 and the environmental conditions information received from the onboard monitoring system 213, as described above.

Figure 3:
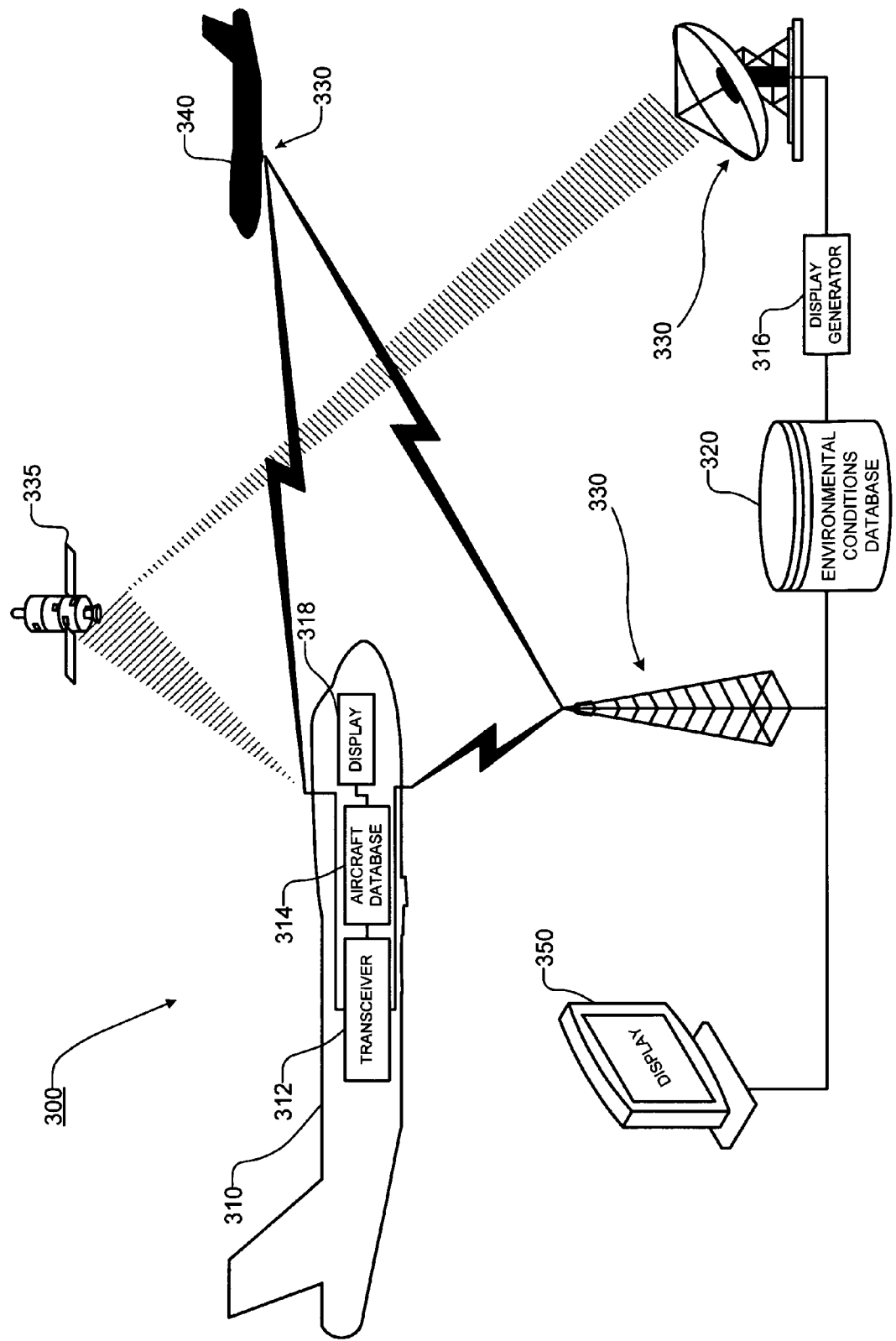
FIG. 3 shows a third exemplary embodiment of the environmental conditions display system according to this invention.

FIG. 3 shows an environmental conditions display system incorporating a third exemplary embodiment of an environmental conditions display system 300 according to this invention. As shown in FIG. 3, the environmental conditions display system 300 includes at least some of an aircraft 310, a transceiver 312, an aircraft characteristics database 314, a display generator 316, a display 318, an environmental conditions database 320, at least one remote transceiver 330, and optionally at least one satellite 335, a transmitting aircraft 340, and an optional at least one remote, or ground display 350.

The elements of the environmental conditions display system 300 correspond to and operate similarly to the same elements discussed above with respect to the environmental conditions display system 100 of FIG. 1. However, in various exemplary embodiments of the environmental conditions display system 300, the receiver 112, as shown in FIG. 1, is replaced with the transceiver 312. However, it should be understood that the receiver 112 and the transceiver 312 may be similar or identical pieces of equipment, but for explanation purposes, the receiver 112 was described as primarily receiving data, while the transceiver 312 will be described as primarily transmitting data. Furthermore, the display generator 316 is located remote from the aircraft 310.

During operation, the environmental conditions display system 300 operates similarly to the environmental conditions display system 100, as shown in FIG. 1. However, the aircraft 310 transmits, via the transceiver 312, the aircraft specific information to the at least one remote transceiver 330. The at least one remote transceiver 330 then transfers the aircraft specific information to the display generator 316. The display generator 316 then prepares the display map using the aircraft specific information received from the aircraft 310 and the environmental conditions information received from the environmental conditions database 320, as described above, with reference to FIG. 1. When the display map is prepared, display map data is transferred, via the at least one remote transceiver 330, to the transceiver 312. The transceiver 312 then transfers the display map data to the display 318 to be displayed.

In this manner, the hardware and software needed to process the environmental conditions information and the aircraft specific information is stored remote from the aircraft 310. Thus, less space is required onboard the aircraft 310 for the environmental conditions display system 300.

Figure 4:
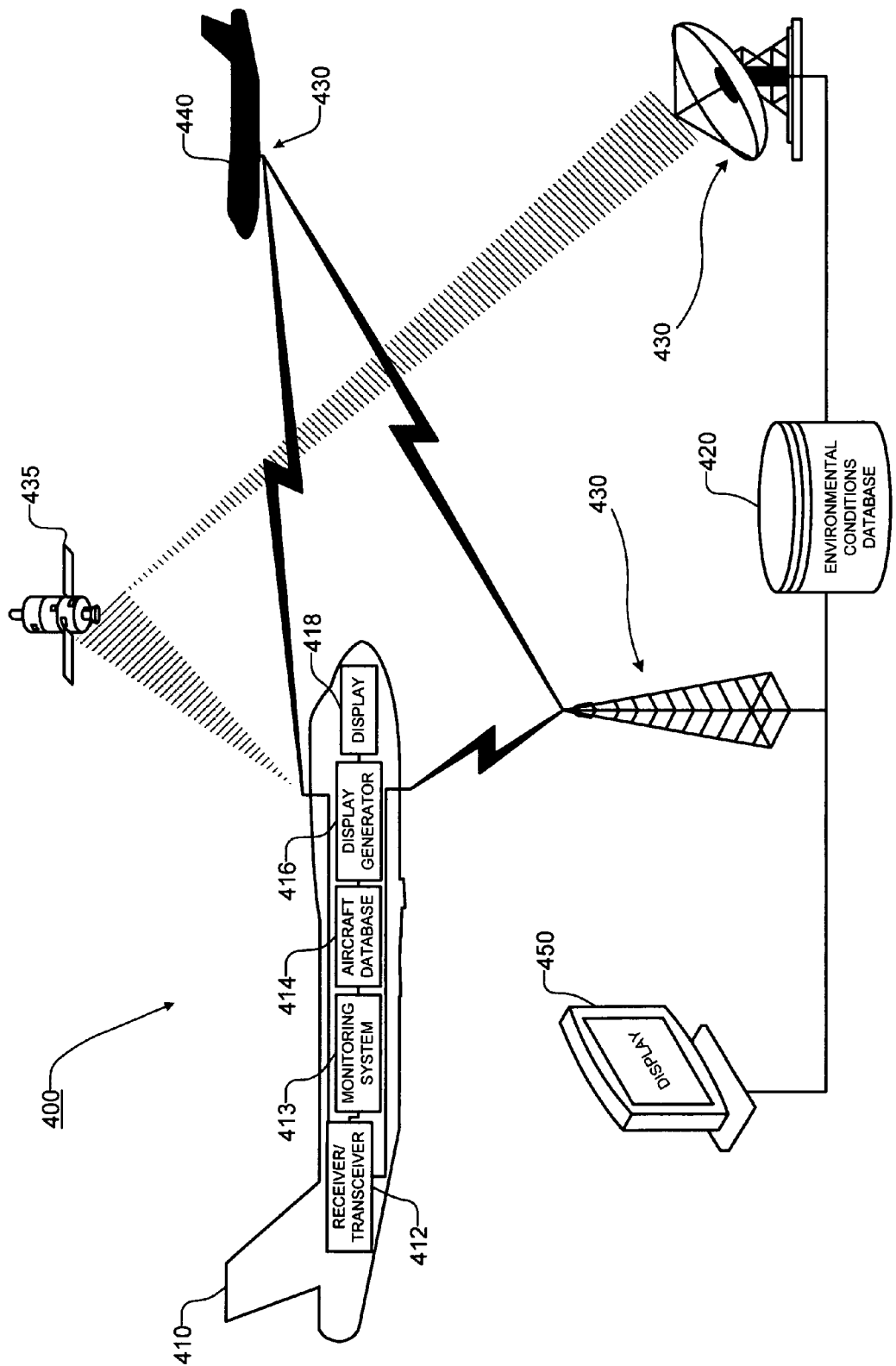
FIG. 4 shows an environmental conditions reporting system according to this invention.

FIG. 4 shows an environmental conditions reporting system 400 according to this invention. As shown in FIG. 4, the environmental conditions reporting system 400 includes at least some of an aircraft 410, a receiver/transceiver 412, an onboard monitoring system 413, an aircraft characteristics database 414, a display generator 416, a display 418, an environmental conditions database 420, at least one environmental conditions transmitter/remote transceiver 430, and optionally at least one satellite 435, a receiving aircraft 440, and an optional at least one remote, or ground display 450.

The elements of the environmental conditions reporting system 400 may correspond to and may operate similarly to the same elements discussed above with respect to the environmental conditions display system 100 of FIG. 1, the environmental conditions display system 200 of FIG. 2, or the environmental conditions display system 300 of FIG. 3. Thus, in various exemplary embodiments, the environmental conditions reporting system 400 may, for example, receive environmental conditions information from a remote source, such as the transceiver 430 or local source, such as the onboard monitoring system 413. Likewise, the environmental conditions reporting system 400 may operate, for example, with the display generator 416 located remote from the aircraft 410 or with the display generator 416 located onboard the aircraft 410.

In various exemplary embodiments of the environmental conditions reporting system 400, the transmitting aircraft 140, as shown, for example, in FIG. 1, is replaced by a receiving aircraft 440. It should be understood that the transmitting aircraft 140 and the receiving aircraft 440 may be identically equipped aircraft, but for explanation purposes, the receiving aircraft 440, of FIG. 4, will be described as primarily receiving data, while the transmitting aircraft 140, of FIG. 1, was described as primarily transmitting data. Furthermore, the aircraft 410 and the aircraft 110 may be identically equipped aircraft; however, the aircraft 410 must include the onboard monitoring system 413.

The onboard monitoring system 413 includes onboard monitoring and/or sensing equipment that provides data regarding certain of the dynamic vehicle conditions, such as, for example, performance characteristics, center of gravity, vertical acceleration, lateral acceleration, speed, angle of attack, angle of sideslip, and direction, and the like. Data from these sensors and systems is used to determine the affect environmental conditions are having on the aircraft 410, and the strength of the turbulence the aircraft 410 is experiencing. In various exemplary embodiments, the onboard monitoring system 413 may include a weather radar, an infrared (IR) sensor, a laser radar (LIDAR), or the like. Appropriate sensors and systems for monitoring, sensing, and measuring the affects of environmental conditions on an aircraft are well known in the art.

In various exemplary, non-limiting embodiments of this invention, the strength of the turbulence the aircraft 410 is experiencing is defined in terms of the loads or accelerations experienced by the aircraft 410 or some diagnostic thereof. For example, the turbulence may be determined using the Root-Mean-Square (RMS) value of the loads experienced by the aircraft 410. However, it should be appreciated this is not the only method for defining the strength of the turbulence that the aircraft 410 is experiencing.

For example, aircraft wake turbulence experienced by the aircraft 410 on a final approach may be determined based on the lateral loads experienced by the aircraft 410.

Thus, it should be appreciated that the systems and methods of this invention are capable of differentiating between a turbulence measurement that is the result of the state of the atmosphere and a turbulence hazard that is the result of a load experienced by a vehicle. Mere atmospheric measurements are less significant in light of turbulence that creates a hazard to a vehicle or its occupants.

In the various exemplary embodiments, the aircraft characteristics database 414 includes a database that stores environmental conditions threshold values. The environmental conditions threshold values represent values that, when exceeded, indicate a level of environmental conditions, such as turbulence, which may adversely affect an aircraft other than the aircraft 410, such as the receiving aircraft 440. This threshold may not be at a level hazardous to the aircraft 410 or its occupants, but at a level that will be hazardous to the receiving aircraft 440 or its occupants.

During operation of the environmental conditions reporting system 400, when dynamic vehicle information is received from the monitoring system 413, the aircraft characteristics database 414 uses various algorithms to determine an environmental conditions value for the received environmental conditions information. This value represents the severity of the environmental conditions.

Once the environmental conditions value is determined, the environmental conditions value is compared to an environmental conditions threshold value in the aircraft characteristics database 414. If the environmental conditions value has reached or exceeded the given environmental conditions threshold value, data relating to the environmental conditions is transmitted. The transmitted environmental conditions information contains data relating to the dynamic vehicle information, the environmental conditions, the environmental conditions value, and/or the environmental conditions threshold value. The transmitted environmental conditions information also contains sufficient information to interpret the transmitted data once received. The transmitted data may also contain static or additional dynamic information regarding the aircraft 410.

It should also be appreciated that the transmitted data and/or information may be transmitted in an encrypted or coded fashion, such that the transmitted data and/or information may only be interpreted by authorized recipients. Furthermore, the data and/or information may be transmitted to a ground-based receiver, an airborne receiver, or a space-based receiver. The receiver may, for example be a specific receiver, such as a specific receiving aircraft 440, or a general receiver, such as any aircraft within a predetermined distance from the aircraft 410.

For example, if the aircraft 410 is a relatively large aircraft, it may experience a level of turbulence that is almost negligible and well below an environmental conditions threshold value for turbulence that would adversely affect the aircraft 410 or cause the turbulence to be displayed on the display 418. Nonetheless, the environmental conditions reporting system 400 will, using appropriate algorithms and environmental conditions threshold values included in the aircraft characteristics database 414, may determine that the environmental conditions value is above an environmental conditions threshold value for some smaller aircraft, such as the receiving aircraft 440.

The systems and methods of the environmental conditions reporting system 400 will then transmit data representing the level of turbulence the aircraft 410 is experiencing, such that the data could be received by the receiving aircraft 440. The data may be transmitted via direct transmission to the receiving aircraft 440 and received by the receiving aircraft's transceiver 430, or via indirect transmission, by way of a ground-based transceiver 430 or satellite-based transceiver 435 and received by the receiving aircraft's transceiver 430.

When the receiving aircraft 440 receives this data, the data is interpreted and the level of hazard to the receiving aircraft 440 is determined, as further described herein, and appropriately displayed.

Likewise, if the aircraft 410 is a relatively small aircraft, it may experience a level of turbulence that is extreme for the aircraft 410, but is well below a threshold value for turbulence that would adversely affect any larger aircraft, such as the receiving aircraft 440. In this case, the systems and methods of the environmental conditions reporting system 400 may not transmit data representing the level of turbulence the aircraft 410 is experiencing, because the receiving aircraft 440 would not be adversely affected by the level of turbulence and it is unnecessary for the turbulence to be displayed to the pilot of the receiving aircraft 440.

In this manner, the environmental conditions reporting system 400 is able to be controlled to transmit environmental conditions information or environmental conditions values only when a particular environmental conditions threshold value is exceeded. This reduces or eliminates continuous, constant streaming of environmental data (including null reports). The continuous streaming of environmental data, particularly if the data stream only includes null turbulence reports, can be costly and burdensome on the communications infrastructure, particularly when many aircraft are making reports of no turbulence.

In various exemplary, non-limiting embodiments this invention, the environmental conditions reporting system 400, whether through components located onboard the aircraft 410, the receiving aircraft 440, the ground (such as components associated with the remote, or ground display 450), and/or a combination of these locations, is able to determine whether a given aircraft, such as, for example, aircraft 410, is equipped with an appropriate reporting system that is capable of transmitting at least some environmental conditions data and/or information regarding a location and/or a severity of at least one environmental condition that the aircraft 410 is experiencing.

The environmental conditions reporting system 400, is also able to determine at least some of a location of the aircraft 410, the flight path of aircraft 410, and the environmental conditions threshold for the aircraft 410. The environmental conditions threshold for the aircraft 410 may be a determined level of environmental condition that can adversely affect the specific aircraft 410. However, the environmental conditions threshold for the aircraft 410 may also be a determined level of environmental condition that can adversely affect the occupants of aircraft 410.

Furthermore, the environmental conditions reporting system 400, is also able to determine that no transmission of at least some environmental conditions data and/or information has been received from the aircraft 410.

Then, based on a lack of a transmission of at least some environmental conditions data and/or information being received from the aircraft 410, the environmental conditions reporting system 400 is able to determine that the aircraft 410 is not experiencing an environmental condition, at the determined location, which exceeds the environmental conditions threshold for the aircraft 410.

Based on the determination that the aircraft 410 is not experiencing an environmental condition, at the determined location, which exceeds the environmental conditions threshold for the aircraft 410, the environmental conditions reporting system 400 can generate a display, for example on the display 450, at least one environmental condition annotation that represents a lack of environmental conditions that exceed the environmental conditions threshold for the aircraft 410.

In various exemplary, non-limiting embodiments, the aircraft 410 may transmit at least some environmental conditions data and/or information regarding a location and/or a severity of at least one environmental condition when the at least one environmental condition exceeds an environmental conditions threshold for the aircraft 410 or another aircraft. Thus, the environmental conditions reporting system 400 can receive environmental conditions information from one aircraft (even though that aircraft is not experiencing an environmental condition that exceeds the environmental conditions threshold for that aircraft), and apply the environmental conditions information to another aircraft with a different environmental conditions threshold.

Thus, using the determined information, the systems and methods of this invention can determine and display regions of "less than threshold" turbulence without unduly burdening the air traffic control communications infrastructure with a constant stream of environmental data.

However, in various exemplary embodiments, the environmental conditions reporting system 400 may be controlled to transmit a constant stream of environmental data.

In various exemplary, non-limiting embodiments, the environmental conditions reporting system 400 may be controlled to transmit environmental data or environmental conditions information according to certain routing parameters. For example, the aircraft 410 may transmit environmental data or environmental conditions information, as described herein, to another aircraft, a satellite-based system, one or more ground stations, and/or other vehicles.

For example, the aircraft 410 may transmit environmental data or environmental conditions information to a ground station. Once the environmental data or environmental conditions information is received, the data or information is stored on a server. The stored data or information is then combined with certain dynamic and/or static vehicle information, as described herein, to produce an environmental conditions report.

The ground station may then transmit the environmental conditions report, with the included dynamic and/or static vehicle information, to the aircraft 410 and/or any other aircraft, such as the receiving aircraft 440, or any other vehicle, source, or server.

In certain exemplary embodiments, the report may be transmitted when a report value exceeds a predetermined threshold. Alternatively, the report may be transmitted based on the geographic location of the reporting or the receiving entity (e.g. along a flight path of an aircraft); the age of the report or the underlying environmental data or environmental conditions information; the distance relative to a projected path; the priority of the report relative to other reports (e.g. reports that include significant environmental conditions information are transmitted ahead of reports that include minimal environmental conditions information); or whether the report contains duplicative information.

It should be appreciated that although the environmental conditions reporting system 400 has been described as being located and operating onboard the aircraft 410, in various exemplary embodiments, the environmental conditions reporting system 400 may be located and operate as a ground-based or satellite-based system. In these various embodiments, ground-based or satellite-based sensors monitor the environmental conditions and transmit environmental conditions information when particular environmental conditions threshold values are reached.

Figure 5:
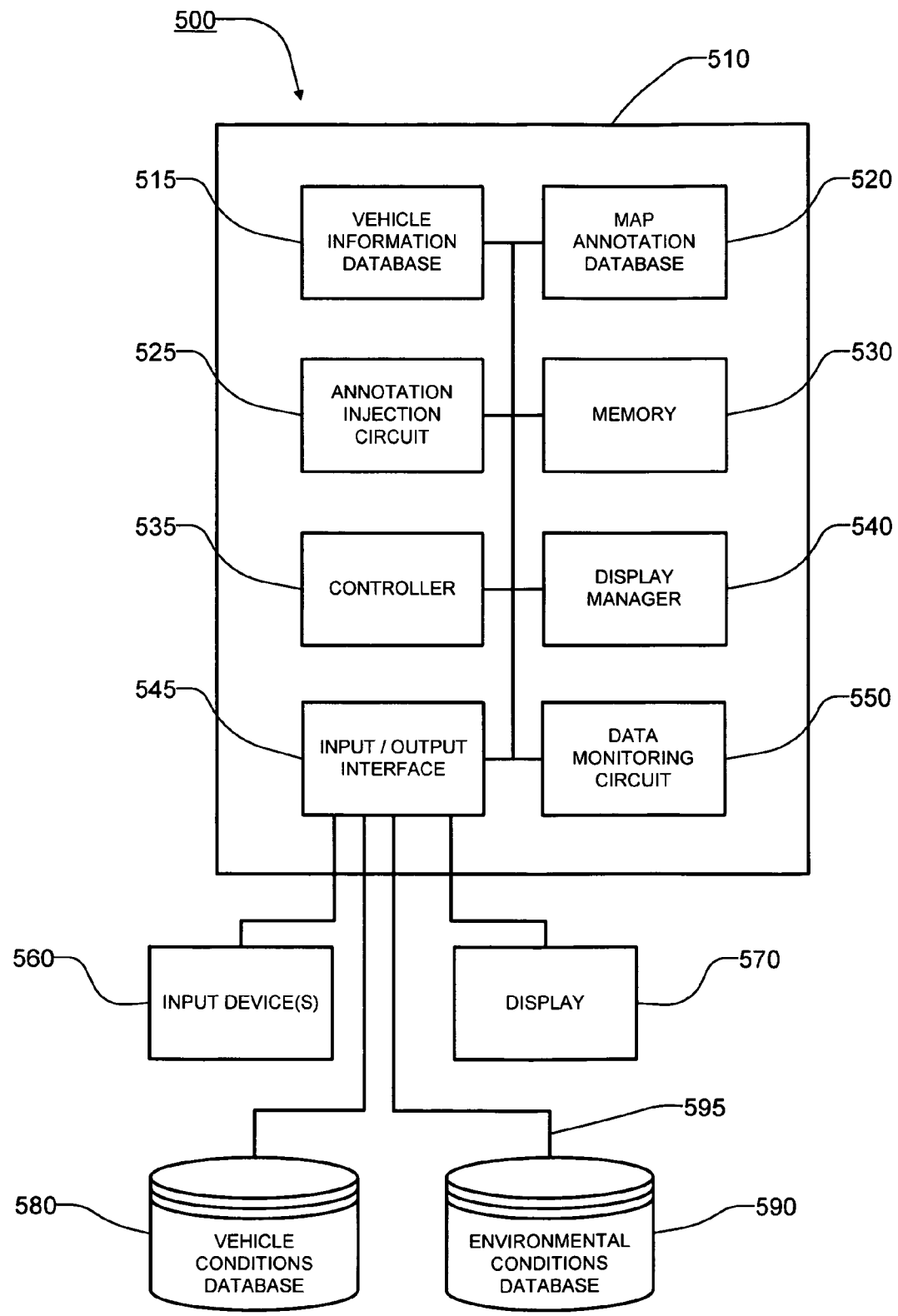
FIG. 5 is a functional block diagram outlining an exemplary embodiment of the environmental conditions display system according to this invention.

FIG. 5 is a functional block diagram outlining an exemplary embodiment of an environmental conditions display system 500 according to this invention. As shown in FIG. 5, one exemplary embodiment of an environmental conditions display system 500 includes a computer or central processing unit (CPU) 510, one or more input devices 560, a display 570, a vehicle conditions database 580, and an environmental conditions database 590.

The computer or CPU 510 includes at least some of a vehicle information database 515, a map annotation database 520, an annotation injection circuit 525, a memory 530, a controller 535, a display manager 540, an input/output interface 545, and a data monitoring circuit 550. The computer or CPU 510 interfaces with the one or more input devices 560 and the display 570 through the input/output interface 545. Additionally, the computer or CPU 510 interfaces with both the vehicle conditions database 580 and the environmental conditions database 590, via a linked connection 595, through the input/output interface 545.

In various exemplary embodiments, the memory 530 can be implemented using any appropriate combination of alterable, volatile or non-volatile memory or non-alterable, or fixed, memory. The alterable memory, whether volatile or non-volatile, can be implemented using any one or more of non-selectable or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the memory 530 stores software and data including a software program and specific algorithms used by the environmental conditions display system 500. For example, the memory 530 stores map display software and communication software. Map display software and communications software are familiar to those of ordinary skill in the art.

The controller 535 manages reading data from and writing data to the memory 530. The controller 535 also drives the transmission of data to and the reception of data from the one or more input devices 560, the environmental conditions database 590, and the display 570, through the input/output interface 545.

The data monitoring circuit 550 monitors incoming data from the vehicle conditions database 580 and the environmental conditions database 590.

The vehicle conditions database 580 at least stores dynamic aircraft data specific to the particular aircraft that is being flown. In various exemplary embodiments, the dynamic aircraft data includes data about the aircraft characteristics that change during flight, such as, the aircraft's weight, performance characteristics, center of gravity, vertical acceleration, lateral acceleration, configuration, functionality of any automated control systems, or the like.

The environmental conditions database 590 includes information relating to weather and other environmental conditions. In various exemplary embodiments, the environmental conditions database 590 is located in the aircraft itself, and receives environmental condition information from, for example, an onboard radar system. In various other exemplary embodiments, the environmental conditions database 590 is a remote database, which transmits the environmental conditions information to the aircraft. In still other exemplary embodiments, the environmental conditions database 590 is an airborne database located in, for example, another aircraft or a satellite, which transmits the environmental conditions information to the aircraft.

The vehicle information database 515 at least stores static data specific to the particular aircraft that is being flown. In various exemplary embodiments, the static data includes data about the aircraft that does not change during flight, such as, the aircraft's size, propulsion, mode of propulsion, structure, type of control system(s), type of control surfaces, longitudinal aerodynamics, lateral aerodynamics, maximum weight, structural limitations, mechanical limitations, performance limitations, safety limitations, maximum operational ceiling, maximum Mach numbers, maximum airspeeds, or the like.

The map annotation database 520 stores environmental condition annotations to be added to the maps stored in the memory 530. The environmental condition annotations might be, for example, a particular style or color of shading, or an icon that is displayed on a map to alert a pilot to certain environmental conditions, as described above. The annotation injection circuit 525 injects the environmental condition annotations in one or more appropriate locations, as dictated by the controller 535 and the vehicle information database 515, into the map or maps stored in the memory 530.

In various exemplary embodiments, the display manager 540 drives the display 570. The display 570 can be a cathode ray tube display, a liquid crystal display, a plasma display, a light emitting diode (LED) display, a printer, or any other known or later developed system capable of displaying data. The one or more input devices 560 can be one or more of a keyboard, a mouse, a touch screen, a switch, a knob, a button, an enable widget, a touch pad, a microphone or any other known or later developed device capable of inputting data.

In the various exemplary embodiments described herein, the computer or CPU 510 interfaces, for example, with the vehicle conditions database 580 and the environmental conditions database 590.

In the various exemplary embodiments described herein, the computer or CPU 510 interfaces, for example, with the environmental conditions database 590, through the linked connection 595 using the input/output interface 545. Alternatively, the computer or CPU 510 can interface with the environmental conditions database 590, through a direct wired connection. The linked connection 595 can be any known or later developed device or system for connecting the computer or CPU 510 to the environmental conditions database 590, including a wireless link, a connection over a LAN, a WAN, or any other distributed network, a connection over the public switched telephone network, a connection over a coaxial cable (i.e., CATV) system, a connection over a cellular telephone network, a very high frequency (VHF) connection, an ultra high frequency (UHF) connection, a radio frequency (RF) connection, a satellite connection, or the like. In general, the linked connection 595 can be any known or later developed connection system or structure usable to connect the computer or CPU 510 to the environmental conditions database 590, including both wired and wireless connections.

In the various exemplary embodiments described herein, the computer or CPU 510 interfaces, for example, with the one or more input devices 560 and/or the display 570, through a direct wired connection. Alternatively, the computer or CPU 510 can interface with the one or more input devices 560 and/or the display 570, through a linked connection, as described above, using the input/output interface 545.

In various exemplary embodiments, the environmental conditions display system 500 will be included as part of the software executing on the computer or CPU. It should be appreciated that any other known or later developed system capable of processing and outputting data could be used in place of the computer or CPU. While generating environmental conditions annotations based on environmental conditions information and vehicle specific information is not currently known, appropriate software for coordinating with, for example, the display 570 and displaying the graph data included in the environmental conditions annotations is elementary, and essentially the same as found in the prior art systems.

During operation of one exemplary embodiment of the environmental conditions display system 500, the input/output interface 545 receives aircraft specific information from the aircraft conditions database 580 and environmental conditions information from the environmental conditions database 590. As the environmental conditions display system 500 receives the aircraft specific information and the environmental conditions information, the data monitoring circuit 550 monitors all of the information that is contained in the received aircraft specific and environmental conditions information.

The controller 535 then sends the aircraft specific and environmental conditions information to the memory 530, where information from the vehicle information database 515 and the map annotation database is included. The algorithms within the memory 530 then determine appropriately iconized environmental conditions annotations for each environmental condition that is strong enough to affect the aircraft, as described above.

As appropriate environmental conditions annotations are determined, the annotation injection circuit 525 injects the appropriate environmental conditions annotations in one or more appropriate locations in appropriate map information stored in the memory 530.

The map information including the appropriate environmental conditions annotations is then sent to the display manager so that an environmental conditions display map can be produced. Once the environmental conditions display map is produced, the environmental conditions display map is transmitted, through the input/output interface 545, to the display 570.

When the environmental conditions display map is displayed, the pilot can use the one or more input devices 560 to alter the display field as further described herein.

Figure 6:
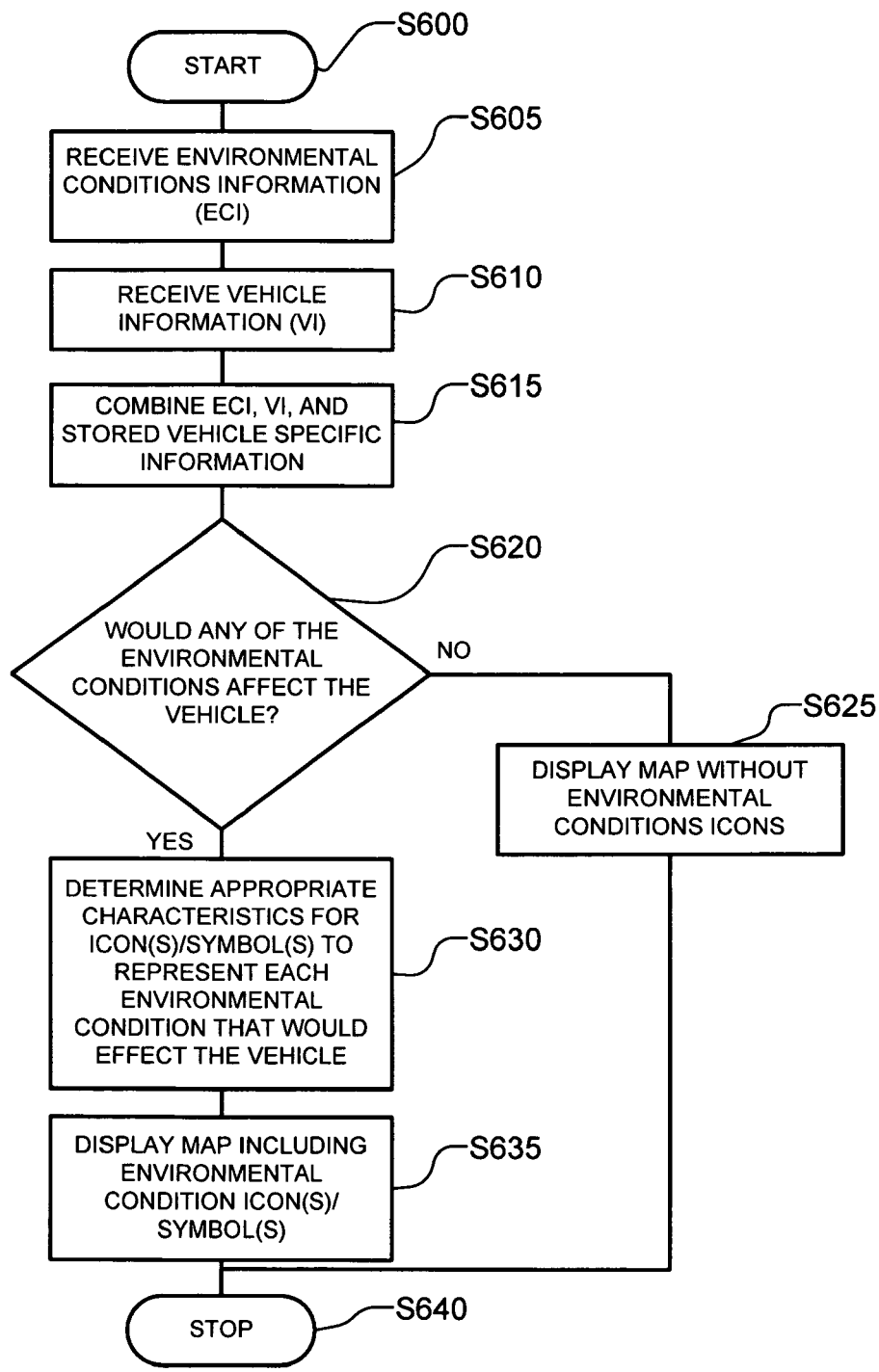
FIG. 6 is a flowchart outlining one exemplary embodiment of a method for using the environmental conditions display system according to this invention.

FIG. 6 is a flowchart outlining one exemplary embodiment of a method for using the environmental conditions display system according to this invention. In various exemplary embodiments, as environmental conditions information is received, a display map is created and/or updated to show the environmental conditions as the environmental conditions relate to a particular vehicle.

In various exemplary embodiments, environmental condition annotations include one or more styles or colors of shading, or icons that are displayed on the display map to alert the user to certain environmental conditions, as described above. Additionally, custom environmental condition annotations can be added as dictated by the user.

As shown in FIG. 6, beginning in step S600, control continues to step S605 where environmental conditions information is received. Then, in step S610, vehicle information is received. Next, in step S615, the received environmental conditions information is combined with the received vehicle information and with stored vehicle specific information. Control then continues to step S620.

In step S620, a determination is made whether any of the received environmental conditions information represent environmental conditions that are severe enough to affect the particular vehicle. If, in step S620, it is determined that none of the environmental conditions are severe enough to affect the particular vehicle, control advances to step S625. Otherwise, control jumps to step S630.

In step S625, a display map is produced that does not include any environmental condition annotations. Control then jumps to step S640.

In step S630, appropriate characteristics, such as, for example, shading, coloring, iconization, or the like, are determined to reflect the spatial extent and severity of each environmental conditions annotation that represents an environmental condition that is severe enough to affect the particular vehicle. Then, in step S635, a display map is produced that includes an appropriate environmental condition annotation for each environmental condition that is severe enough to affect the particular vehicle. Control then continues to step S640 where the method ends.

It should be understood that the method for using the environmental conditions display system described above can be implemented such that the method restarts either at predetermined time intervals, at the request of a user, when the environmental conditions information is updated, or when certain predetermined vehicle information changes.

In various exemplary embodiments, the display map can be stored in a memory, such as, for example, the memory 530 of the computer or CPU 510 described above with reference to FIG. 5. Additionally, the vehicle specific information and the environmental conditions annotations can be stored in a vehicle information database and a map annotation database, such as, for example, the vehicle information database 515 and the map annotation database 520, respectively, as described above with reference to FIG. 5.

Figure 7:
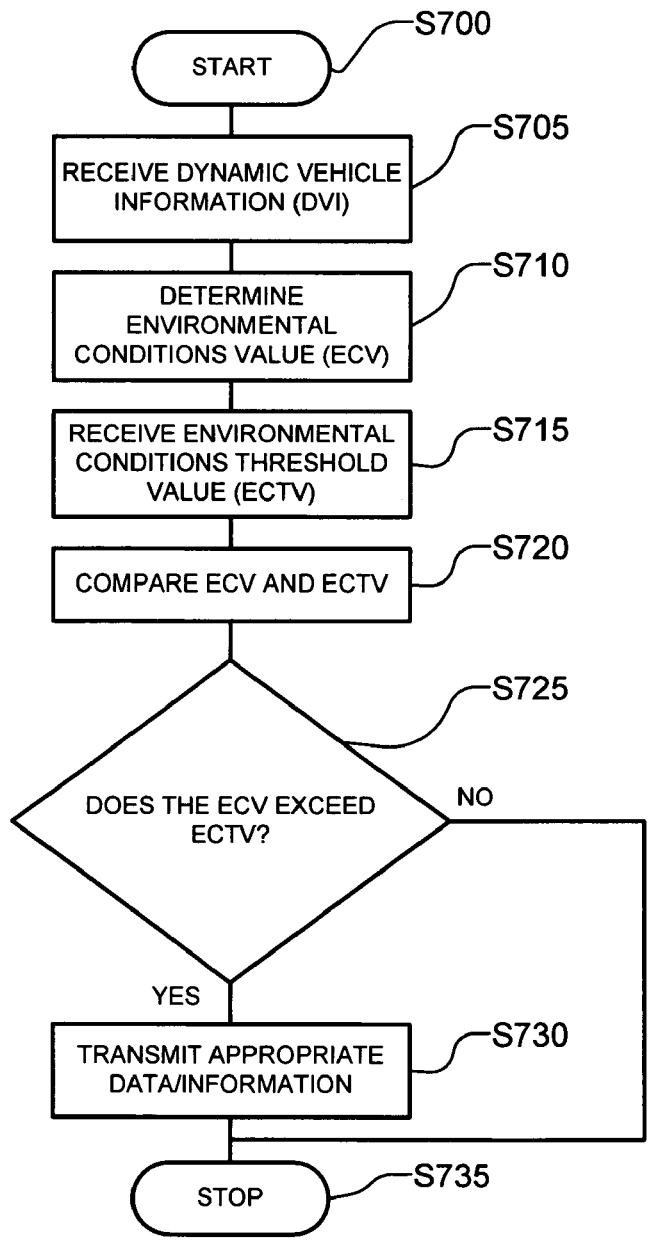
FIG. 7 is a flowchart outlining one exemplary embodiment of a method for determining whether to transmit environmental conditions information according to this invention.

FIG. 7 is a flowchart outlining one exemplary embodiment of a method for determining whether to transmit environmental conditions information according to this invention. In various exemplary embodiments, the environmental conditions information is used to determine environmental conditions threshold information. The environmental conditions threshold information is determined using data from various aircraft-, satellite-, or ground-based monitoring and/or sensing equipment, such as, for example the onboard monitoring system 413 of FIG. 4 and algorithms located, for example, in the aircraft characteristics database 414, as described above, with reference to FIG. 4.

As shown in FIG. 7, beginning in step S700, control continues to step S705 where at least some dynamic vehicle information is received. It should be appreciated that the dynamic vehicle information represents information related to the environmental conditions the aircraft is encountering. Then, in step S710, an environmental conditions value is determined for the received dynamic vehicle information. Control then continues to step S715.

In step S715, an environmental conditions threshold value is received.

Next, in step S720, the determined environmental conditions value is compared to the received environmental conditions threshold value. Control then continues to step S720.

In step S725, a determination is made whether the environmental conditions value is greater than the received environmental conditions threshold value. If, in step S725, it is determined that the environmental conditions value is not greater than the received environmental conditions threshold value, control advances to step S735. Otherwise, control continues to step S730.

In step S730, appropriate data and/or information relating to the environmental conditions, the dynamic vehicle information, the environmental conditions value, and/or the environmental conditions threshold value is transmitted.

Control then continues to step S740 where the method ends.

It should be understood that this method for determining whether to transmit environmental conditions information can be implemented such that the method restarts either at predetermined time intervals, at the request of a user, when environmental conditions information is updated, or when certain predetermined vehicle information changes.

It should be appreciated that, in various exemplary embodiments, the environmental conditions information can be automatically transmitted from a source, such as, for example, from aircraft-, satellite-, or ground-based monitoring, sensing, and/or other equipment. In certain of these exemplary embodiments, the environmental conditions information can be automatically transmitted as part of an automatic process (e.g. based on a request or a threshold exceedance), or transmitted as part of a manual process.

For example, a ground-based monitoring system may determine that an aircraft is heading into a region of severe turbulence either as scaled for that particular aircraft, or based on the severity of the report by the reporting aircraft. The ground-based monitoring system can automatically request that a report, including the turbulence information, be generated and transmitted to the aircraft.

Alternatively, a ground-based monitoring system may determine that a region of severe turbulence is developing or has developed either as scaled for that particular aircraft, or based on the severity of the report by the reporting aircraft. In response to the determination, the ground-based monitoring system can automatically request that reports, including certain turbulence information, be generated periodically and transmitted to aircraft in, around, or scheduled to enter the region of severe turbulence, so long as the region of severe turbulence is determined to exist. Once it is determined that the region of severe turbulence has dissipated, the ground-based monitoring system may cease requesting or terminate the request for the automatic periodic updates.

It should also be appreciated that, in various exemplary embodiments, the environmental conditions information can be manually transmitted from a source, such as, for example, from aircraft-, satellite-, or ground-based monitoring, sensing, and/or other equipment. In certain of these exemplary embodiments, the environmental conditions information can be automatically transmitted as part of a process that is initiated by a manual interaction (i.e., a pilot requests that environmental conditions information be transmitted).

For example, an aircraft may be sitting at a gate prior to departure and may send a request for environmental conditions information reports along the aircraft's planned route. In response to the request, the receiving server may also receive information concerning the aircraft's flight path.

When such a request is received, the receiving server can prepare the requisite environmental conditions information and send the information to the aircraft. This process may be repeated as the aircraft leaves the gate and the flight progresses.

Alternatively the dispatcher at an airline may be looking at a display of turbulence reports, such as, for example, on a remote, or ground display 150, 350, or 450. One of the aircraft the dispatcher is responsible for handling may be heading into a region of severe turbulence. The dispatcher can manually request that a report, including the turbulence information, be generated and transmitted to the aircraft.

Figure 8:
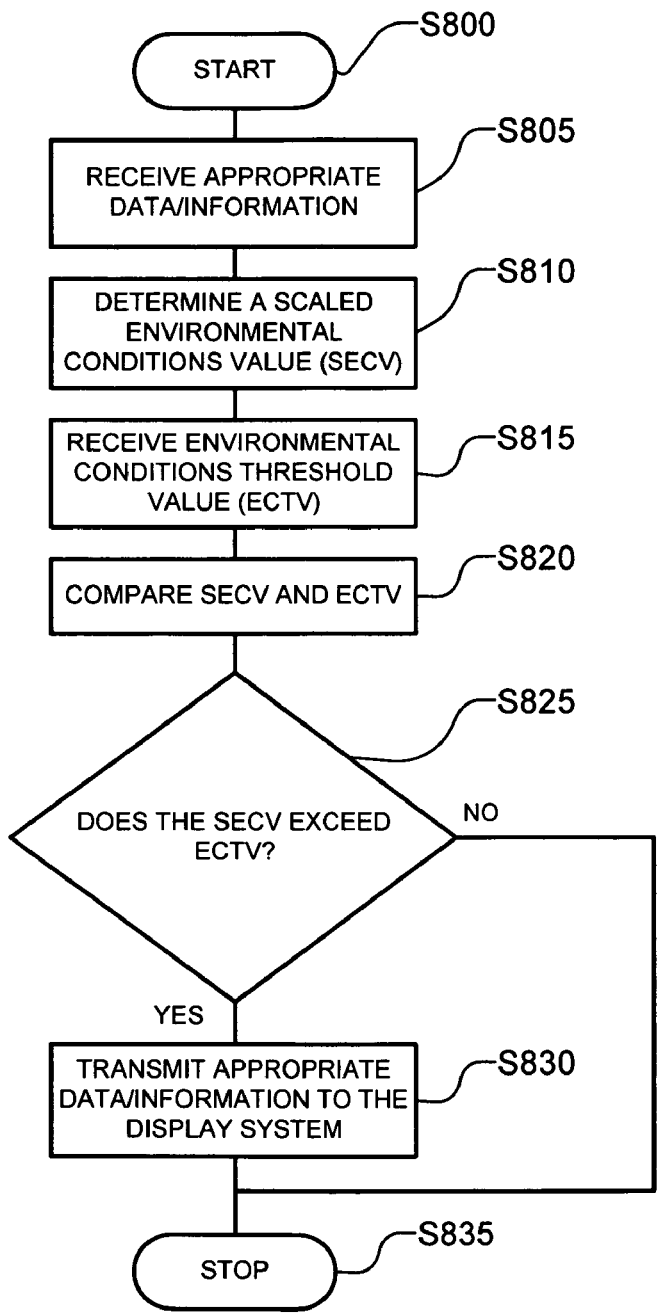
FIG. 8 is a flowchart outlining one exemplary embodiment of a method for determining whether to send environmental conditions information to the display system according to this invention.

FIG. 8 is a flowchart outlining one exemplary embodiment of a method for determining whether to send environmental conditions information to the display system according to this invention. In various exemplary embodiments, the environmental conditions information received is used to determine the environmental conditions threshold information in order to decide whether to display the environmental conditions information. The environmental conditions threshold information is determined using data from various aircraft-, satellite-, or ground-based monitoring and/or sensing equipment, such as, for example the onboard monitoring system 413 of FIG. 4 and algorithms located, for example, in the aircraft characteristics database 414, as described above, with reference to FIG. 4.

As shown in FIG. 8, beginning in step S800, control continues to step S805 where at least some environmental conditions data and/or information is received. It should be appreciated that the received environmental conditions data and/or information may be at least some of the appropriate data and/or information transmitted from step S730 of FIG. 7. Control then continues to step S810.

In step S810, the environmental conditions data and/or information is scaled using certain dynamic and static vehicle information and other information, such as, for example, the vehicle's configuration, airspeed, groundspeed, Mach number, weight, center of gravity location, flap angle, flap setting, angle of attack, angle of sideslip, roll angle, vertical, lateral, or longitudinal loads, landing gear deployment, altitude, aircraft response function, lift curve slope, other aerodynamic data, and fundamental vehicle parameters such as wing area, wing sweep angle, wing aspect ratio, and aircraft response functions.

For example, if an aircraft reports an experienced turbulence value, either a derived meteorological parameter or actual experienced loads, the report may be mixed with, for example, airspeed and aircraft response characteristics to determine a level of turbulence experienced. The aircraft response curve used will be that corresponding to its weight, speed, and configuration.

For instance, an aircraft may report a turbulence encounter of a given intensity at a given time and given location. That aircraft may also report sufficient information to allow the interpretation of the report onboard a suitably equipped receiving aircraft. Scaling allows one aircraft to report to any number of different aircraft, which may each react differently to the turbulence, such that the actual severity of the turbulence encounter may be conveyed to the receiving aircraft in a manner that is useful and relevant to the flight crew of the receiving aircraft. For example, a heavily loaded B-777-300 aircraft may experience light turbulence where a lightly loaded B-737-700 may experience moderate turbulence, however both aircraft are able to make meaningful, scaleable or scaled turbulence hazard reports to each other.

It should be appreciated that aircraft type is not the only factor to be considered, but aircraft loading, flight conditions, and the like. For example, if the same turbulence conditions are experienced by a B-747-400 embarking on a long duration flight, and therefore heavily loaded, and a similar B-747-400 at the end of a flight, and therefore much lighter, the lighter aircraft may experience a greater level of felt turbulence because it is more responsive to turbulence. This correlation also extends to similar aircraft at different altitudes and speeds. Thus, in various exemplary embodiments, this invention allows a receiving aircraft to make a meaningful interpretation of a reporting aircraft's turbulence hazard information and scaling of the received turbulence information may be provided regardless of aircraft type. In certain cases, the scaled value of a hazard may be the same or similar to the reported value for that hazard. In other cases, it may be significantly different.

Thus, in step S810, an appropriately scaled environmental conditions value is determined for the aircraft. Control then continues to step S815.

In step S815, an environmental conditions threshold value is received.

Next, in step S820, the scaled environmental conditions value is compared to the received environmental conditions threshold value. Control then continues to step S825.

In step S825, a determination is made as to whether the scaled environmental conditions value is greater than the received environmental conditions threshold value. If, in step S825, it is determined that the scaled environmental conditions value is not greater than the received environmental conditions threshold value, control advances to step S835. Otherwise, control continues to step S830.

In step S830, appropriate data and/or information relating to the environmental conditions, the dynamic vehicle information, the scaled environmental conditions value, and/or the environmental conditions threshold value is transmitted to the display system.

Control then continues to step S835 where the method ends.

It should be understood that this method for determining whether to transmit appropriate environmental conditions data and/or information, dynamic vehicle information, the scaled environmental conditions value, and/or the environmental conditions threshold value can be implemented such that the method restarts, for example, at predetermined time intervals, at the request of a user, when environmental conditions information is updated, or when certain predetermined vehicle information changes.

Figure 9:
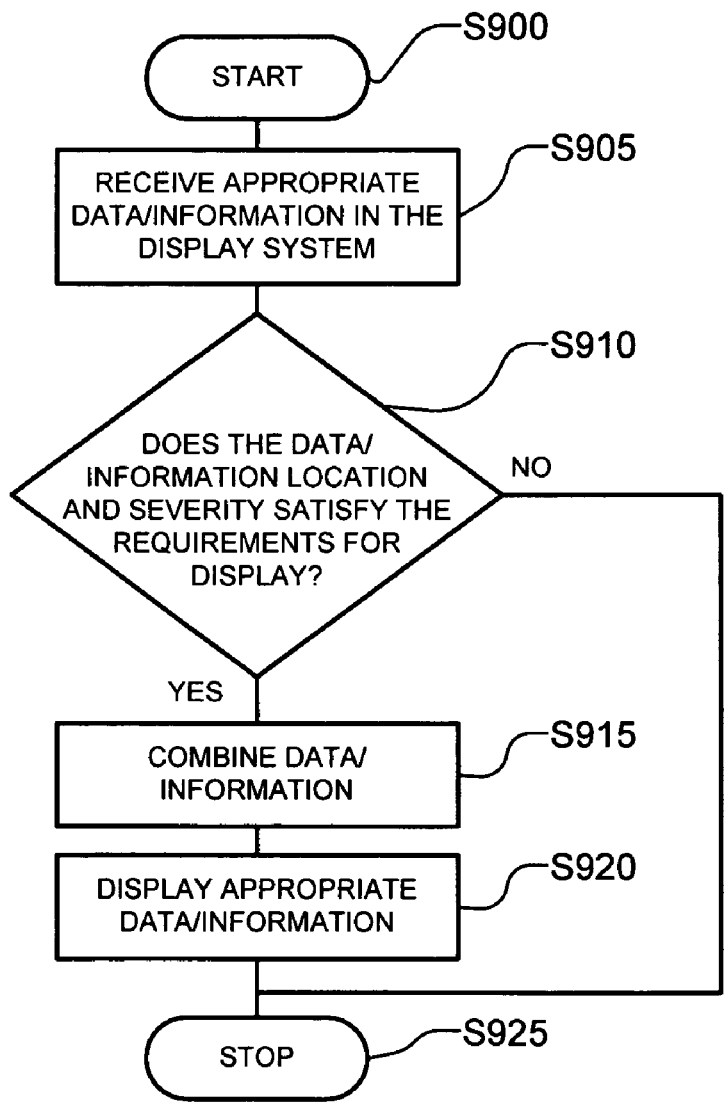
FIG. 9 is a flowchart outlining one exemplary embodiment of a method for receiving environmental conditions information and deciding whether to display the information according to this invention.

FIG. 9 is a flowchart outlining one exemplary embodiment of a method for receiving appropriate environmental conditions information and deciding whether and how to display this information according to this invention. Many factors must be taken into account in displaying environmental conditions information, particularly if the data contains hazard information that may affect the safety of a vehicle and its operation. For example, it is preferable to avoid a "cluttered" display, and to avoid increasing crew workload. It is also important to allow crews to select their region of interest, either in range, altitude, or even in severity of the hazards. In addition, there may be some hazards based on environmental conditions, which must always be displayed regardless of the crew's selection; e.g., restricted areas (particularly dynamically changing areas of restricted access), ground obstacle hazards, severe turbulence, and icing.

The flowchart of FIG. 9 outlines one exemplary embodiment of a method for receiving environmental hazard data from various aircraft-, satellite-, or ground-based monitoring and/or sensing equipment, such as, for example the onboard monitoring system 413, as described above, and subjecting the environmental hazard data to a hierarchy of a decision making process, which will decide whether and how to display the information using algorithms located, for example, in the aircraft characteristics database 414, as described above.

As shown in FIG. 9, beginning at step S900, control continues to step S905 where some appropriate data and/or information is received. In various exemplary embodiments, the appropriate data and/or information is the data and/or information relating to the environmental conditions, the dynamic vehicle information, the scaled environmental conditions value, and/or the environmental conditions threshold value that is transmitted to the display system in step S830 of FIG. 8. It should be understood that the received data and/or information has been scaled to the particular receiving vehicle, and exceeds a predetermined threshold value, such as, for example, the vehicle's environmental conditions threshold value. Control then passes to step S910.

In step S910, a determination is made as to whether the received data and/or information represents data and/or information that is in a location and/or of a severity that satisfies certain predetermined display requirements. It should be appreciated that the determination may be based upon the data and/or information received in step S905 as a whole, or may be based upon certain discrete or individual portions or packets of the data and/or information received in step S905.

The particular display requirements that must be met before a certain piece of data and/or information is represented on a display may vary based upon a number of factors. For example, the display requirements may vary for the display of different environmental conditions, different vehicles, different phases of operation, different operator preferences, and the like.

Some of the factors that should be considered when determining particular display requirements include, among other things, avoiding a "cluttered" display so that important information, such as a severe hazard, is not obscured by comparatively unimportant information, such as a severe hazard; or avoiding increased crew workload; allowing crews to select a particular region of interest based on, for example, a desired range, altitude above or below a given flight path, or severity of hazards. Alternatively, some hazards or environmental conditions are such that they must always be displayed, regardless of the crew's selection or the particular display requirements. For example, it may be determined that restricted areas (particularly newly defined or dynamically changing restricted areas, zones, or regions), ground obstacle hazards, areas of severe turbulence, or areas of icing should always be shown, regardless of the particular display requirements.

In various exemplary embodiments, a static or dynamic display hierarchy may be employed to determine whether received data and/or information represents data and/or information that will be displayed. The display hierarchy may rank hazards such that certain hazards receive preeminence over other hazards in the same region, based on their rank on the display hierarchy. In this manner, a hazard that appears higher on the display hierarchy will be displayed instead of a hazard that appears lower on the display hierarchy. In certain embodiments, a hazard that appears higher on the display hierarchy will be displayed instead of a hazard that appears lower on the display hierarchy only when the hazards appear in the same or substantially similar area or when the display of one of the hazards may overshadow the display of the other hazard.

One exemplary display hierarchy, which is ranked from most severe to least severe, may include: (1) terrain hazards including buildings and other obstacles, (2) restricted areas, (3) severe turbulence within 50 miles of the vehicle, (4) severe turbulence further than 50 miles from the vehicle, (5) moderate turbulence within 50 miles of the vehicle, (6) moderate turbulence further than 50 miles from the vehicle, (7) light turbulence within 50 miles of the vehicle, (8) light turbulence further than 50 miles from the vehicle, (9) icing within 50 miles of the vehicle, (10) icing further than 50 miles from the vehicle, (11) IFR conditions, and (12) turbulence null reports. In various exemplary embodiments, scaling a value may be a factor included in the display hierarchy.

In various exemplary embodiments, the pilot may manually override the display hierarchy (or some portion thereof), in order to customize a display to certain preferences or to optimize the display for a particular situation or phase of travel or flight.

Returning to FIG. 9, if, in step S910, it is determined that the received data and/or information represents data and/or information that is in a location and/or of a severity that does not satisfy the predetermined display requirements, control advances to step S925. Otherwise, control continues to step S915.

In step S915, the received data and/or information that represents data and/or information that is in a location and/or of a severity that satisfies the predetermined display requirements is combined and prepared for display.

Then, in step S920, the prepared data and/or information is displayed. When the data and/or information is displayed, control continues to step S925 where the method ends.

Figure 10:
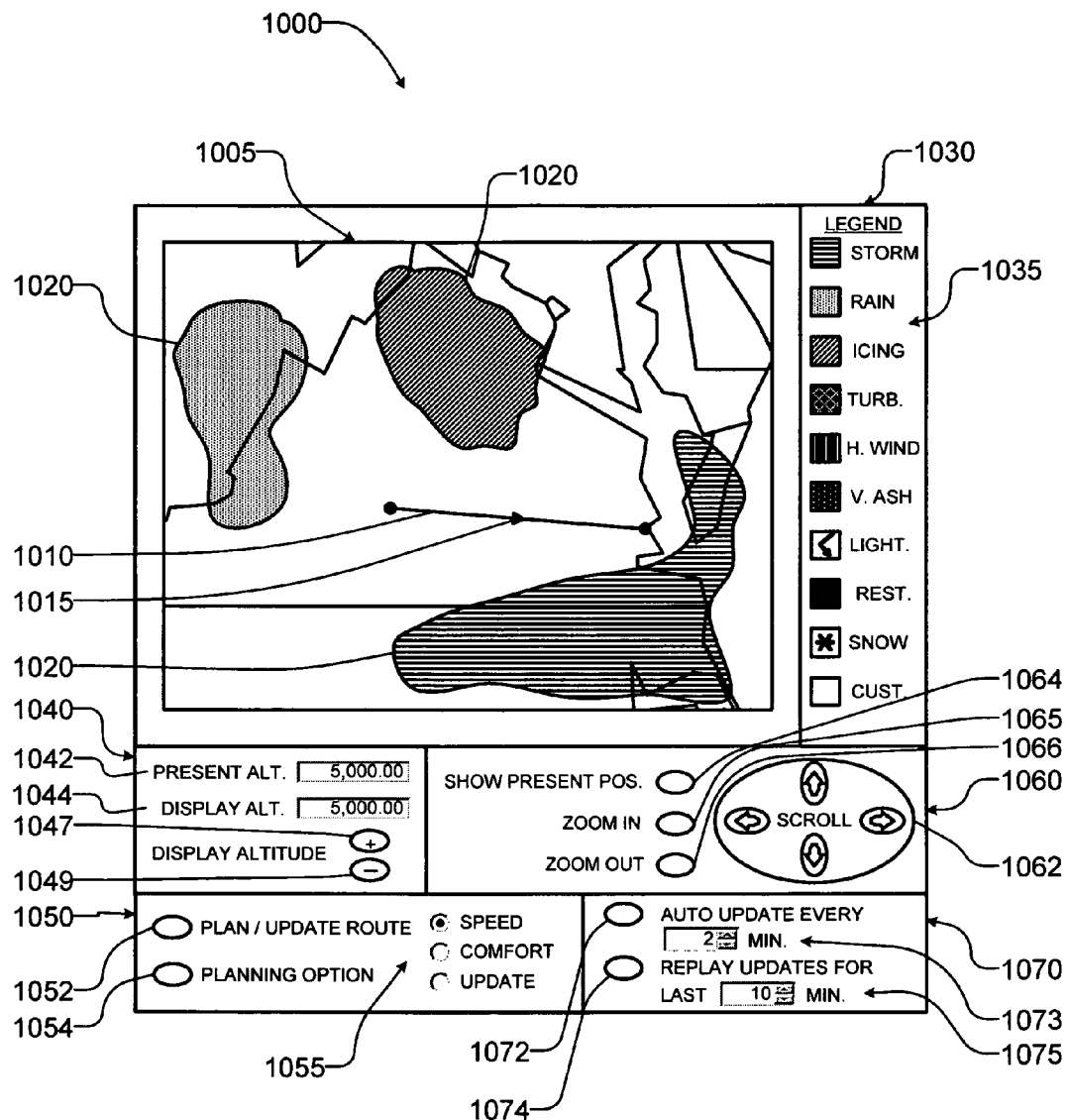
FIG. 10 shows one exemplary embodiment of a display using the environmental conditions display system according to this invention.

FIG. 10 shows one exemplary embodiment of a display using the environmental conditions display system according to this invention. As shown in FIG. 10, the environmental conditions display system 1000 includes at least some of a map display portion 1005, a legend portion 1030, a flight conditions display portion 1040, a flight planning/update portion 1050, a map display functions portion 1060, and/or a display update/replay portion 1070.

The map display portion 1005 includes at least some of a background map of an area, a flight path line 1010, and a reference icon 1015 indicating the aircraft's present position and direction along the flight path line 1010. The map display portion may also include at least one environmental condition annotation 1020 displayed over the background map of the area.

In various exemplary embodiments, the legend portion 1030 includes a list of environmental conditions. Each environmental condition is associated with a displayed annotation, such as, for example variable coloring, shading pattern, or iconization. These annotations are used by the environmental conditions display system 1000 to alert the pilot to a variety of environmental conditions, as described above. In this manner, the pilot does not have to remember what each of the annotations represents, but is able to quickly reference each displayed environmental condition annotation.

In various exemplary embodiments, the flight conditions display portion 1040 includes some of a present altitude display 1042, a displayed altitude display 1044, and displayed altitude adjustment enable widgets 1047 and 1049. The present altitude display 1042 shows the present altitude of the aircraft. In contrast, the displayed altitude display 1044 shows the altitude of the environmental conditions displayed in the map display portion 1005. The displayed altitude adjustment enable widgets 1047 and 1049 allow the pilot to increase or decrease the altitude of the environmental conditions displayed in the map display portion 1005. Thus, the pilot is able to investigate the environmental conditions at various altitudes without changing the altitude of the aircraft.

In various exemplary embodiments, the flight conditions display portion 1040 also includes a present altitude enable widget, not shown. The present altitude enable widget allows the pilot to automatically return the display to the aircraft's present altitude. Alternatively, this present altitude display function could be accomplished, for example, by depressing both of the displayed altitude adjustment enable widgets 1047 and 1049 simultaneously.

In various exemplary embodiments, the flight planning/update portion 1050 includes some of a plan/update route enable widget 1052, a planning option enable widget 1054, and a planning option display 1055. Selection of the plan/update route enable widget 1052 allows the pilot to, for example, input a departure and arrival point and allow the environmental conditions display system 1000 to determine a route of travel. The route would be determined using the environmental conditions data and the aircraft information data as described above.

If the aircraft is in flight, or if a route has been planned, the plan/update route enable widget 1052 can update, and alter if necessary, the route using updated environmental and aircraft information data.

The planning option enable widget 1054 allows the pilot to select the criteria that the plan/update route function uses to determine and/or update the route. For example, if the pilot selects a speed function, the plan/update route function will determine the fastest route from the departure point (or the present position) to the destination, while accounting for the environmental conditions and the aircraft characteristics as described above. If the pilot selects a comfort function, the plan/update route function will determine the least turbulent route from the departure point (or the present position) to the destination, while accounting for the environmental conditions and the aircraft characteristics as described above. Alternatively, the pilot may merely choose an update function, which allows the plan/update route function to update the flight route without changing planning options.

The planning option display 1055 allows the pilot to determine which of the planning functions is being used by the plan/update route function to plan/update the route.

The systems and methods of this invention may also be utilized to aid a pilot in the decision-making process when planning and/or updating a travel route. For example, if certain areas of turbulence may result in an uncomfortable ride but do not justify a change in altitude that may result in an increase in fuel burn and therefore increased cost of the flight. The route optimization systems and methods of this invention are able to identify this situation and aid the pilot or route planner in the decision-making process. These decisions may be made by pilots in flight or airline dispatchers on the ground planning a flight or following a flight.

Also, currently large regions of airspace may be shut off to traffic because of the threat of severe environmental conditions. This results in aircraft having to take circuitous and lengthy routes around regions of potential hazard with increased time and cost of operations. With improved knowledge of the location and severity of the hazards, better use and management of the airspace is possible.

However, it should be appreciated that in various illustrative, non-limiting embodiments of this invention, the travel route optimization may be requested and/or carried out by a request from, for example, a pilot viewing a display onboard an aircraft, an air traffic controller viewing a remote, or ground, static display, or may be altered or updated automatically in response to a change in either the environmental conditions or the aircraft characteristics.

Thus, even an aircraft that is not equipped with all of the systems of this invention may benefit from the systems and methods of this invention being utilized by, for example, an air traffic controller viewing a remote, or ground, static display.

In various exemplary embodiments, the map display functions portion 1060 includes some of a show present position enable widget 1064, a zoom in enable widget 1065, a zoom out enable widget 1066, and a display scroll enable widget 1062. By using the functions of the map display functions portion 1060, the pilot is able to view various maps or various sections of the map display portion 1005 in greater or less detail. For example, the zoom in and zoom out enable widgets 1065 and 1066, respectively, allow the pilot to increase or decrease the area displayed by the map display portion 1005.

Similarly, the scroll enable widget 1062 allows the pilot to maintain a constant zoom factor while moving the area shown in the map display portion 1005 up, down, right, or left. The show present position enable widget 1064 allows the pilot to return the map display portion 1005 to a view that shows the present position of the aircraft, for example, in the center of the map display portion 1005.

In various exemplary embodiments, the display update/replay portion 1070 includes some of an auto update enable widget 1072, an update frequency enable widget 1073, a replay enable widget 1074, and a replay time set enable widget 1075. By selecting the auto update enable widget 1072, the environmental conditions display system 1000 will automatically retrieve environmental conditions and aircraft information data and update any environmental condition annotation 1020 and/or the flight path 1010 as necessary.

The update frequency enable widget 1073 allows the pilot to determine how frequently the environmental conditions display system 1000 automatically updates.

In various exemplary embodiments, the environmental conditions display system 1000 also includes a replay enable widget 1074. The replay enable widget 1074 allows the environmental conditions display system 1000 to recall at least the aircraft positioning information and the environmental conditions information from a determined number of updates and display the information sequentially. Thus, the environmental conditions display system 1000 produces an animated display map that allows the pilot to see the way in which various environmental conditions have developed over the determined period of time.

The replay time set enable widget 1075 allows the pilot to determine how far back in time the replay function will go to retrieve the environmental conditions data to be displayed.

For example, as shown in FIG. 10, the update frequency function is set to automatically update every two minutes, while the replay time set function is set to include the update information received in the last ten minutes in an animated replay. Thus, if the pilot selects the replay enable widget 1074 with these settings, the environmental conditions display system 1000 will produce an animated display map consisting of five frames (one for each update) showing any changes in the environmental conditions for the last ten minutes.

Map display software and the display manipulation features described above, such as, for example, the zoom in, zoom out, and route planning/updating functions are familiar to even the lay person who accesses or operates a commercially available map program.

It should be understood that the enable widgets described herein can be any known or later developed mechanism or display for allowing a user to select a particular item or function on a display, such as, for example, a switch, a knob, a dial, a check box, a mark box, a radio button, an enable widget, or the like.

The environmental conditions display system 1000 shown in FIG. 10 shows an example of the environmental conditions display system 1000 as the environmental conditions display system 1000 might appear in a large, passenger aircraft, such as, for example, a Boeing® 777-300™. The environmental condition annotations 1020 appear as they might after the systems, methods, and apparatuses of this invention processed received environmental conditions information with reference to aircraft information specific to the Boeing® 777-300™ flying at an altitude of 5,000 feet.

It should also be understood that the actions that can be performed by the environmental conditions display system 1000 of this invention are not limited to the actions listed above. The environmental conditions display system 1000 of this invention can perform any actions that can be performed by software executing on a programmed general purpose computer, a special purpose computer, a microprocessor, or the like.

Figure 11:
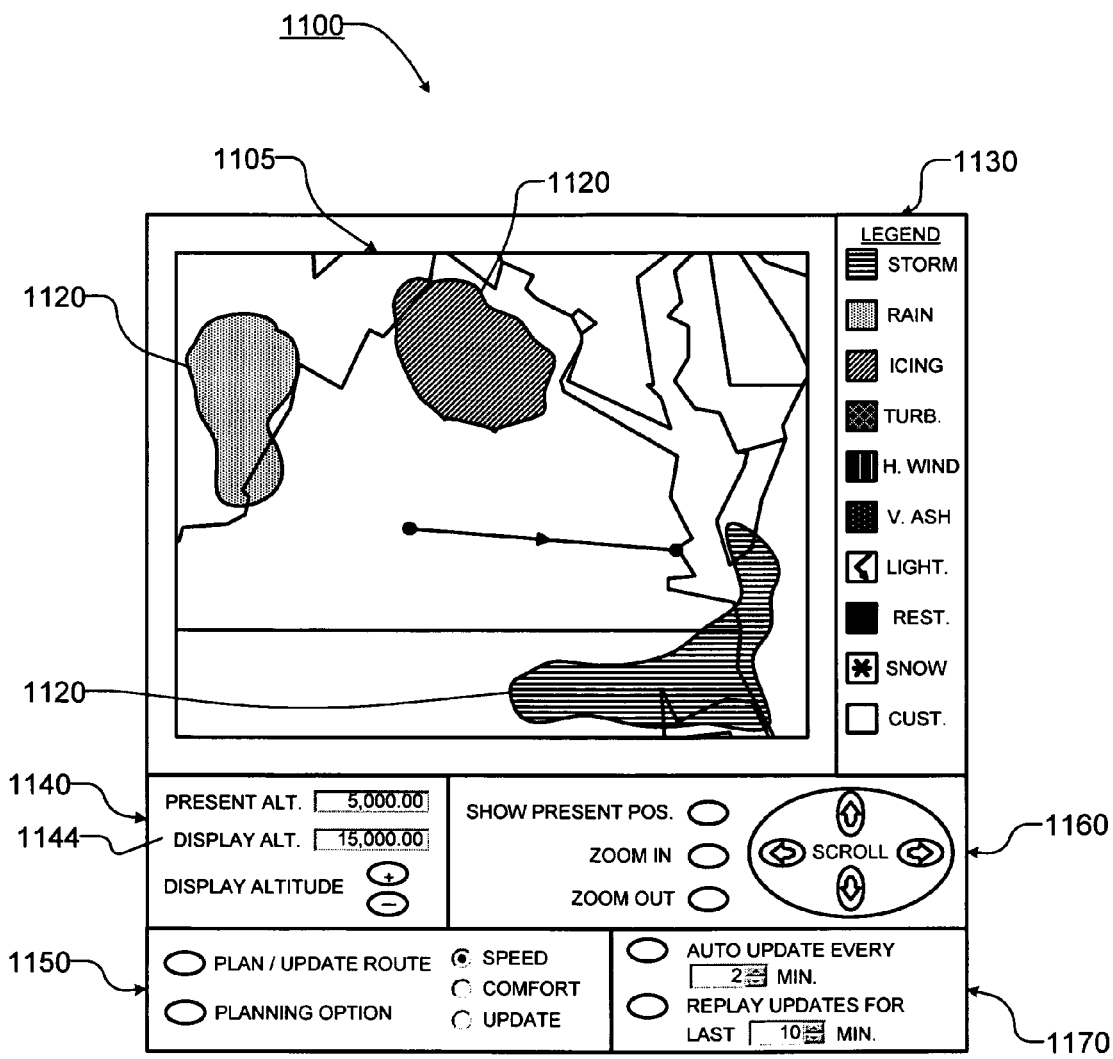
FIG. 11 shows a second exemplary embodiment of a display using the environmental conditions display system according to this invention.

FIG. 11 shows a second exemplary embodiment of a display using the environmental conditions display system according to this invention. As shown in FIG. 11, the environmental conditions display system 1100 includes at least some of a map display portion 1105, at least one environmental condition annotation 1120, a legend portion 1130, a flight conditions display portion 1140, a flight planning/update portion 150, a map display functions portion 1160, and/or a display update/refresh portion 1170.

The environmental conditions display system 1100 functions similarly to the environmental conditions display system 1000, as described above with respect to FIG. 10. However, the environmental conditions display system 1100, shown in FIG. 11, is an example of how the map display portion 1105 might appear when the pilot uses the altitude adjustment enable widgets 1147 and 1149 to adjust the displayed altitude.

As shown in FIG. 11, the environmental condition annotations 1120 appear as they might after the systems, methods, and apparatuses of this invention process the same environmental conditions data as processed in FIG. 10. Yet, as shown in FIG. 11, the environmental conditions data is processed with reference to aircraft information specific to the Boeing® 777-300™ flying at an altitude of 15,000 feet instead of flying at an altitude of 5,000 feet.

Thus, as shown in FIG. 11, the environmental condition annotations 1120 encompass a smaller area than the environmental condition annotations 1020, as shown in FIG. 10. The environmental condition annotations 1120 reflect a change in the environmental conditions as compared to FIG. 10 because the environmental condition change for a particular aircraft as the aircraft changes altitude, as described above.

Figure 12:
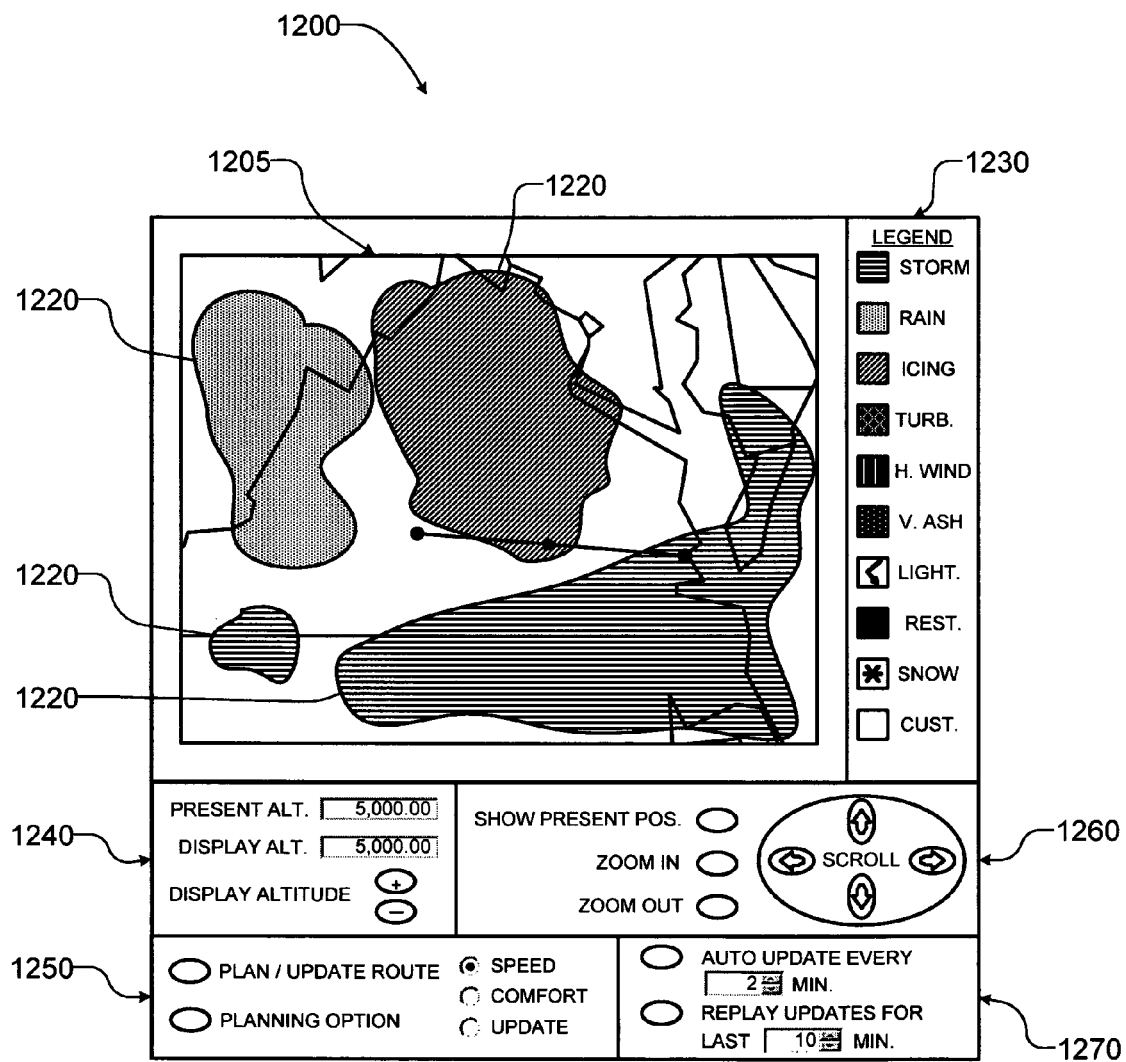
FIG. 12 shows a third exemplary embodiment of a display using the environmental conditions display system according to this invention.

FIG. 12 shows a third exemplary embodiment of a display using the environmental conditions display system according to this invention. As shown in FIG. 12, the environmental conditions display system 1200 includes at least some of a map display portion 1205, at least one environmental condition annotation 1220, a legend portion 1230, a flight conditions display portion 1240, a flight planning/update portion 1250, a map display functions portion 1260, and/or a display update/refresh portion 1270.

The environmental conditions display system 1200 functions similarly to the environmental conditions display system 1000, as described above with respect to FIG. 10. However, the environmental conditions display system 1200, shown in FIG. 12, shows an example of the how the map display portion 1205 might appear in a small, single-engine aircraft, such as, for example, a Cessna® 172R™ Skyhawk™. The environmental condition annotations 1220 appear as they might after the systems, methods, and apparatuses of this invention process the same environmental conditions data as processed in FIG. 10. Yet, as shown in FIG. 12, the environmental conditions data is processed with reference to aircraft information specific to the Cessna® 172R™ Skyhawk™ flying at an altitude of 5,000 feet instead of the Boeing® 777-300™ flying at an altitude of 5,000 feet.

Thus, when comparing FIG. 12 to FIG. 10, the environmental condition annotations 1220, shown in FIG. 12, encompass a larger area than the environmental condition annotations 1020, shown in FIG. 10. The changes to the environmental condition annotations 1020 and 1220 do not reflect a change in the environmental conditions or the altitude of the aircraft. To the contrary, the changes to the environmental condition annotations are due to the characteristics of the smaller aircraft.

Figure 13:
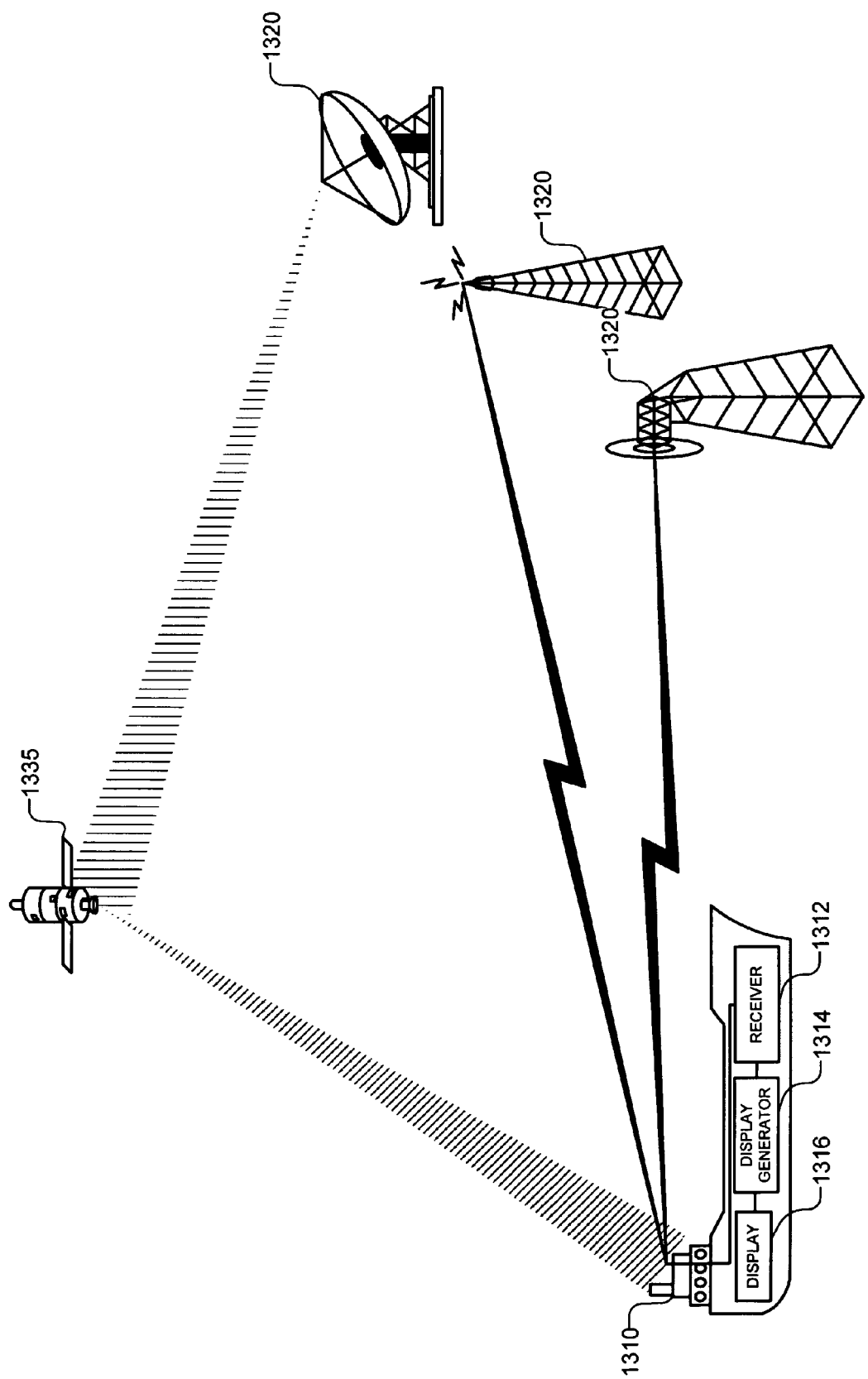
FIG. 13 shows a fourth exemplary embodiment of the environmental conditions display system according to this invention.

FIG. 13 shows a fourth exemplary embodiment of the environmental conditions display system according to this invention. As shown in FIG. 13, the environmental conditions display system 1300 includes at least some of a watercraft 1310, a receiver 1312, a display generator 1314, a display 1316, and at least one environmental conditions transmitter 1320.

The environmental conditions display system 1300 functions similarly to the environmental conditions display system 100, as described above with respect to FIG. 1. However, in various exemplary embodiments, the environmental conditions display system 1300 receives environmental conditions information and processes the received environmental conditions information with reference to watercraft specific information to produce a display that shows environmental conditions annotations for environmental conditions that would affect the specific watercraft.

In various exemplary embodiments of the environmental conditions display system 1300, the environmental conditions display system 1300 functions similarly to the environmental conditions display systems 100 and 200, as described above with respect to FIGS. 1 and 2. Additionally, in various exemplary embodiments, the environmental conditions display system 1300 employs a display similar to the environmental conditions display systems 1000, 1100, and/or 1200, as described above with respect to FIGS. 10, 11, and 12. However, in various exemplary embodiments, the environmental conditions display system 1300 also includes environmental conditions annotations that reflect nautical environmental conditions, such as, for example, wind speed at sea level, nautical currents, water depth, and wave height.

It should be understood that although some environmental conditions, such as lightning, fog, and/or restricted areas, affect all aircraft regardless of the specific characteristics of the aircraft, the systems, apparatuses, and methods of this invention display appropriate symbols and/or icons to represent the environmental conditions that represent a universal hazard to all aircraft.

It should also be understood that each of the elements of the environmental conditions display system can be implemented as portions of a suitably programmed general-purpose computer. Alternatively, each of the elements of the environmental conditions display system can be implemented as physically distinct hardware circuits within an ASIC, or using a FPGA, a PDL, a PLA or a PAL, or using discrete logic elements or discrete circuit elements. The particular form that each of the elements of the environmental conditions display system will take is a design choice and will be obvious and predicable to those skilled in the art.

Moreover, the environmental conditions display system can be implemented as software executing on a programmed general-purpose computer, a special purpose computer, a microprocessor, or the like.

Thus, in summary, the environmental conditions display system can be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 6 or FIG. 7 can be used to implement the environmental conditions display system.

While this invention has been described in conjunction with the exemplary embodiments outlined above, it is evident that many alternatives, modifications, and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for planning or updating a travel route for a vehicle based on a potential affect of environmental conditions on a particular vehicle, comprising:
    receiving at least a first location point of a journey and a second location point of a journey;
    determining a best travel route from at least the first location point of the journey to the second location point of the journey;
    receiving environmental conditions information regarding environmental conditions for at least the determined best travel route;
    receiving at least some dynamic vehicle information;
    receiving at least some static vehicle information;
    determining, based on the determined best travel route, the received environmental conditions information, the received vehicle information, and the received vehicle specific information, whether any environmental conditions for at least the determined best travel route represent environmental conditions that are severe enough to affect the particular vehicle;
    re-determining, if any environmental conditions represent environmental conditions that are severe enough to affect the particular vehicle, the best travel route to avoid the environmental conditions that represent environmental conditions that are severe enough to affect the particular vehicle; and
    creating a display that shows at least the determined best travel route and at least one environmental condition annotation that represents each environmental condition that is severe enough to affect the particular vehicle.

2. The method of claim 1, wherein the at least some dynamic vehicle information is predetermined or estimated dynamic vehicle information.

3. The method of claim 1, wherein the at least some static vehicle information is predetermined or estimated static vehicle information.

4. The method of claim 1, wherein re-determining the best travel route includes re-determining the best travel route based on at least one of, total avoidance of any environmental conditions severe enough to affect the particular vehicle, best fuel economy, fuel burn, trip costs, most comfortable ride, fastest traverse of a particular region, changing configuration of the aircraft and/or airspace management.

5. The method of claim 1, wherein the display that shows at least the determined best travel route and at least one environmental condition annotation is a display that is remote from the particular vehicle.

6. The method of claim 1, wherein the display that shows at least the determined best travel route and at least one environmental condition annotation is a ground-based display.

7. The method of claim 1, wherein the display that shows at least the determined best travel route and at least one environmental condition annotation is used for flight planning, air traffic control, and/or air traffic management.

8. A method for displaying received environmental conditions information, comprising:
    receiving at least some scaled data and/or information from a transmitting vehicle, wherein the scaled data and/or information is scaled environmental conditions information that has been scaled to the particular transmitting vehicle, and exceeds a predetermined threshold value for the transmitting vehicle, and wherein the at least some scaled data and/or information includes at least some information regarding a location and/or a severity of at least one environmental condition;
    receiving at least some static vehicle information regarding the transmitting vehicle;
    determining, based on the at least some scaled data and/or information and the at least some static vehicle information, a location and a severity of at least one environmental condition represented by the scaled environmental conditions information;
    preparing, if the at least one environmental condition represents at least one environmental condition that is in a location and/or of a severity that satisfies a predetermined display requirement, at least one environmental condition annotation that represents the at least one environmental condition; and
    displaying, on a ground-based display, the at least one prepared environmental condition annotation so as to represent the location and/or severity of the at least one environmental condition on the ground-based display.

9. The method of claim 8, wherein the predetermined threshold value for the vehicle is the vehicle's environmental conditions threshold value.

10. The method of claim 8, wherein the scaled environmental conditions information comprises information relating to environmental conditions, dynamic vehicle information, and/or the vehicles environmental conditions threshold value.

11. The method of claim 8, wherein the predetermined display requirement includes a display hierarchy that ranks hazards such that a hazard that appears higher on the display hierarchy will be displayed instead of a hazard that appears lower on the display hierarchy.

12. The method of claim 8, wherein the predetermined display requirement includes at least some hazards or environmental conditions that must always be displayed when present.

13. A method for displaying received environmental conditions information, comprising:
    receiving at least some environmental conditions data and/or information from a transmitting vehicle, wherein the at least some environmental conditions data and/or information includes at least some information regarding a location and/or a severity of at least one environmental condition;
    scaling the received environmental conditions data and/or information such that a scaled environmental conditions value is determined for at least one particular vehicle;
    determining whether the scaled environmental conditions value represents an environmental condition that is in a location and/or of a severity that satisfies a predetermined display requirement;
    preparing, if the scaled environmental conditions value represents an environmental condition that is in a location and/or of a severity that satisfies the predetermined display requirement, at least one environmental condition annotation that represents the at least one environmental condition for display; and
    displaying, on a ground-based display, the at least one prepared environmental condition annotation so as to represent the location and/or severity of the at least one environmental condition on the ground-based display.

14. The method of claim 13, wherein the step of determining whether the scaled environmental conditions value represents an environmental condition that is in a location and/or of a severity that satisfies a predetermined display requirement, includes the steps of:
    receiving an environmental conditions threshold value;
    comparing the scaled environmental conditions value to the received environmental conditions threshold value;
    determining whether the scaled environmental conditions value is greater than the received environmental conditions threshold value; and
    determining, if the scaled environmental conditions value is greater than the received environmental conditions threshold value, that the scaled environmental conditions value represents an environmental condition that is in a location and/or of a severity that satisfies a predetermined display requirement.

15. A method for displaying environmental conditions information, comprising:
    determining a location of a vehicle that is capable of transmitting at least some environmental conditions data and/or information regarding a location and/or a severity of at least one environmental condition;
    determining that no transmission of at least some environmental conditions data and/or information has been received from the vehicle;
    determining an environmental conditions threshold for the vehicle;
    determining, based on a lack of a transmission of at least some environmental conditions data and/or information being received from the vehicle, that the vehicle is not experiencing an environmental condition, at the determined location, which exceeds the environmental conditions threshold for the vehicle;
    preparing, if it is determined that that the vehicle is not experiencing an environmental condition, at the determined location, which exceeds the environmental conditions threshold for the vehicle, at least one environmental condition annotation that represents a lack of environmental conditions which exceed the environmental conditions threshold for the vehicle for display; and
    displaying the at least one prepared environmental condition annotation so as to represent the location and/or environmental conditions threshold for the vehicle on a display.

16. The method of claim 15, wherein the vehicle is capable of transmitting at least some environmental conditions data and/or information regarding a location and/or a severity of at least one environmental condition when the at least one environmental condition exceeds an environmental conditions threshold for the vehicle or another vehicle.

17. The method of claim 15, wherein the environmental conditions threshold for the vehicle is a determined level of environmental condition that may adversely affect a specific vehicle or the vehicle's occupants.

18. The method of claim 15, wherein the at least one environmental condition annotation is a scaled environmental condition annotation.

19. The method of claim 15, wherein the at least one environmental condition annotation that represents a lack of environmental conditions, which exceed the environmental conditions threshold for the vehicle, is an empty environmental condition annotation, such that no environmental condition annotation is displayed.

* * * * *